(12) United States Patent
Laliberte

(10) Patent No.: US 12,069,099 B2
(45) Date of Patent: Aug. 20, 2024

(54) COMPUTER-IMPLEMENTED METHODS, SYSTEMS COMPRISING COMPUTER-READABLE MEDIA, AND ELECTRONIC DEVICES FOR AUTONOMOUS CYBERSECURITY WITHIN A NETWORK COMPUTING ENVIRONMENT

(71) Applicant: ClearVector, Inc., Reston, VA (US)

(72) Inventor: John N. Laliberte, Reston, VA (US)

(73) Assignee: ClearVector, Inc., Reston, VA (US)

( * ) Notice: Subject to any disclaimer, the term of this patent is extended or adjusted under 35 U.S.C. 154(b) by 323 days.

(21) Appl. No.: 17/551,641

(22) Filed: Dec. 15, 2021

(65) Prior Publication Data

US 2022/0191250 A1 Jun. 16, 2022

Related U.S. Application Data

(60) Provisional application No. 63/125,799, filed on Dec. 15, 2020, provisional application No. 63/125,805, filed on Dec. 15, 2020, provisional application No. 63/125,802, filed on Dec. 15, 2020, provisional application No. 63/125,813, filed on Dec. 15, 2020, provisional application No. 63/125,812, filed on Dec. 15, 2020.

(51) Int. Cl.
| | | |
|---|---|---|
| *H04L 9/40* | (2022.01) | |
| *G06F 16/28* | (2019.01) | |
| *G06F 16/901* | (2019.01) | |
| *G06N 20/00* | (2019.01) | |
| *H04L 67/30* | (2022.01) | |

(52) U.S. Cl.
CPC ............ *H04L 63/20* (2013.01); *G06F 16/285* (2019.01); *G06F 16/9024* (2019.01); *G06N 20/00* (2019.01); *H04L 63/1416* (2013.01); *H04L 63/1425* (2013.01); *H04L 63/1466* (2013.01); *H04L 67/30* (2013.01)

(58) Field of Classification Search
CPC ... G06F 16/285; G06F 16/9024; G06N 20/00; H04L 63/1416; H04L 63/1425; H04L 63/1466; H04L 63/20; H04L 67/30
See application file for complete search history.

(56) References Cited

U.S. PATENT DOCUMENTS

| | | | | |
|---|---|---|---|---|
| 11,461,696 B2 * | 10/2022 | Jain | ...................... | G06F 21/31 |
| 11,611,569 B2 * | 3/2023 | Mitelman | .............. | G06N 20/20 |
| 2015/0082432 A1 * | 3/2015 | Eaton | ..................... | H04L 43/16 |
| | | | | 726/23 |
| 2017/0220669 A1 * | 8/2017 | Wei | ......................... | G06F 16/00 |

(Continued)

*Primary Examiner* — Thomas J Dailey
(74) *Attorney, Agent, or Firm* — Hovey Williams LLP

(57) ABSTRACT

A computer-implemented method for autonomous cybersecurity. The method may include: receiving data elements relating to resources and/or activity within a network computing environment; feeding at least some of the elements to an optimizer program to calculate a first distance to a system goal; based on the first distance, implementing pre-determined changes in the environment; receiving post-implementation data records relating to resources and/or activity within the environment; calculating a second distance to the system goal by feeding the post-implementation data records to the optimizer program; and configuring the optimizer program for additional advancement toward the system goal based on comparison of the first and second distances.

16 Claims, 10 Drawing Sheets

(56) References Cited

U.S. PATENT DOCUMENTS

| | | | |
|---|---|---|---|
| 2018/0103064 A1* | 4/2018 | Ahuja | H04L 63/20 |
| 2020/0134394 A1* | 4/2020 | Teshome | G06F 18/25 |
| 2020/0244696 A1* | 7/2020 | Thomas | H04L 63/1416 |
| 2021/0390478 A1* | 12/2021 | Krishnamoorthy | G06Q 10/06313 |

* cited by examiner

COMPUTER-IMPLEMENTED METHODS, SYSTEMS COMPRISING COMPUTER-READABLE MEDIA, AND ELECTRONIC DEVICES FOR AUTONOMOUS CYBERSECURITY WITHIN A NETWORK COMPUTING ENVIRONMENT

RELATED APPLICATIONS

This patent application claims priority to the following U.S. Patent Applications: U.S. Patent Application No. 63/125,799, filed Dec. 15, 2020, and entitled SYSTEMS AND METHODS FOR UNDERSTANDING ACTIVITY; U.S. Patent Application No. 63/125,805, filed Dec. 15, 2020, and entitled SYSTEMS AND METHODS FOR NARRATIVE DRIVEN NAVIGATION, INVESTIGATION AND RESPONSE; U.S. Patent Application No. 63/125,802, filed Dec. 15, 2020, and entitled SYSTEMS AND METHODS FOR VERIFYING ACTIVITY; U.S. Patent Application No. 63/125,812, filed Dec. 15, 2020, and entitled SYSTEMS AND METHODS FOR FORENSICS AND RESPONSE; and U.S. Patent Application No. 63/125,813, filed Dec. 15, 2020, and entitled SYSTEMS AND METHODS FOR AUTONOMOUS CYBERSECURITY. The entire contents of each of the aforementioned provisional patent applications are hereby incorporated herein by reference.

FIELD OF THE INVENTION

The present disclosure generally relates to computer-implemented methods, systems comprising computer-readable media, and electronic devices for dynamically and automatically moving one or more state(s) of a network computing environment toward a system goal.

BACKGROUND

Existing methods for recording, representing, analyzing, and intervening in activity across a network computing environment typically involve presenting users with an interface for searching data associated with the environment. The interface enables users to perform searches for data expressly linked to keys such as filenames, IP addresses, hashes, alerts, or the like—primarily by visually presenting the search results to users as a table organized by one or more keys. However, existing methods for representing environments are primitive and fail to provide context useful for network monitoring and security efforts. Further, adjusting the interface and data representation to accommodate new data encountered in a new network computing environment and/or managing intervention(s) into such environments requires extensive and time-consuming manual efforts.

A more efficient and enriched method for monitoring and/or representation of and/or intervention into a network computing environment is needed.

This background discussion is intended to provide information related to the present invention which is not necessarily prior art.

BRIEF SUMMARY

Embodiments of the present technology relate to computer-implemented methods, systems comprising computer-readable media, and electronic devices for autonomous cybersecurity. The embodiments may provide a technological mechanism for improved system integrity and security. Namely, embodiments of the present invention automatically take steps to shore up perceived weakness(es) in system integrity and security. This presents an improved method for providing visibility into operation of resources within the network computing environment and the ability for owner(s) or others administrating or participating in utilization of monitoring and/or verification service(s) to utilize automated methods for intervening in pre-determined and system-specific ways to preserve system integrity and security.

More particularly, in an aspect, a computer-implemented method for autonomous cybersecurity may be provided. The method may include: receiving data elements relating to resources and/or activity within a network computing environment; feeding at least some of the elements to an optimizer program to calculate a first distance to a system goal; based on the first distance, implementing pre-determined changes in the environment; receiving post-implementation data records relating to resources and/or activity within the environment; calculating a second distance to the system goal by feeding the post-implementation data records to the optimizer program; and configuring the optimizer program for additional advancement toward the system goal based on comparison of the first and second distances. The method may include additional, less, or alternate actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Existing methods for representing new environments to users are primitive and fail to provide context useful for network monitoring and security efforts. Further, adjusting such methods to accommodate new data encountered in a new network computing environment and/or managing intervention(s) into such environments requires extensive and time-consuming manual efforts.

A more efficient and enriched method for monitoring and/or representation of and/or intervention into a network computing environment is needed.

According to embodiments of the present invention, a technological mechanism is provided for improved system integrity and security. Namely, embodiments of the present invention automatically take steps to shore up perceived weakness(es) in system integrity and security. This presents an improved method for providing visibility into operation of resources within the network computing environment and the ability for owner(s) or others administrating or participating in utilization of monitoring and/or verification service(s) to utilize automated methods for intervening in pre-determined and system-specific ways to preserve system integrity and security.

Exemplary System

Figure 1:
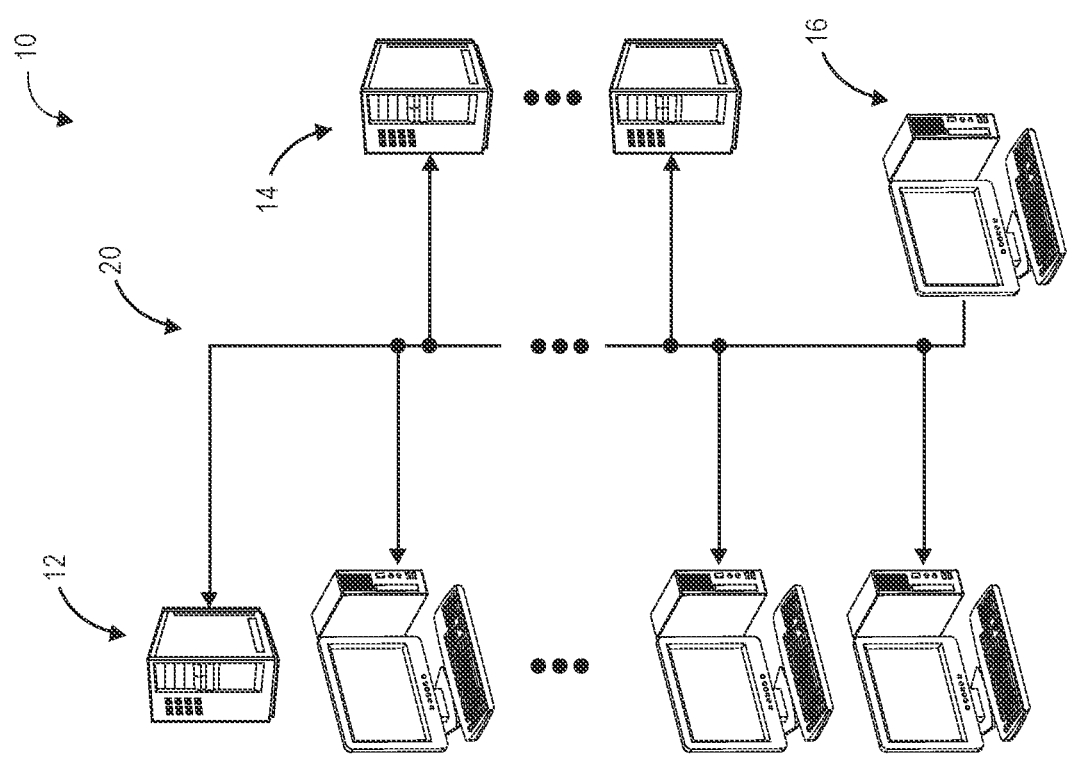
FIG. 1 illustrates various components, in block schematic form, of an exemplary system for monitoring and representation of, and intervention into, a network computing environment in accordance with embodiments of the present invention.

FIG. 1 depicts an exemplary environment 10 for resolved entity and resource description, activity tracking, intervention and verification according to embodiments of the present invention. The environment may include a plurality of client devices 12, a plurality of servers 14, a service device 16, and a communication network 20. The client devices 12 and the servers 14 may be located within network boundaries of a large organization, such as a corporation, a government office, a university, a college, or the like. The communication network 20 may be partly or entirely internal to the organization, for example where the servers 14 manage databases of and/or provide cloud-based services to and under the management of the organization. Also or alternatively, the client devices 12 may access the servers 14 via transmissions, at least in part, across public/semi-public telecommunication network infrastructure, with the communication network 20 being at least in part comprised of such public/semi-public telecommunication network infrastructure.

All or some of the client devices 12 and servers 14, and/or all or some of the virtual resources managed thereby, may at least partly comprise a secure network computing environment. Alternatively or in addition, the client devices 12 and servers 14 may manage access to the client devices 12 and servers 14 under an authentication management framework. For example, each user of a device 12 may be required to complete an authentication process to access secure data sources of and/or services provided via the servers 14 and/or of the devices 12. In one or more embodiments, any authentication management framework may be utilized including, without limitation, custom frameworks and/or frameworks offered under any of the following trademarks and/or service marks as of the date of the initial filing of this disclosure: AWS® SSO and/or COGNITO (trademarks of Amazon Technologies, Inc.), OpenID® Connect (a service mark of the OpenID Foundation), and/or SAML 2.0™ (a service mark of Signet, Inc.).

In one or more embodiments, the client devices 12 may comprise desktops, laptops or other computing devices belonging to or used by employees of a business organization, with servers 14 being cloud infrastructure of a third-party providing cloud-based storage and/or services (e.g., applications) to the business organization. Also or alternatively, the servers 14 may be the property of the organization. One of ordinary skill will appreciate that embodiments may serve a wide variety of organizations and/or rely on a wide variety of data sources and/or service providers within the scope of the present invention. It should also be noted that reference herein to a "business organization" are made for ease of reference, and that embodiments of the present invention are equally applicable to individual users subscribing to a monitoring service and/or executing the monitoring service internally.

Figure 2:
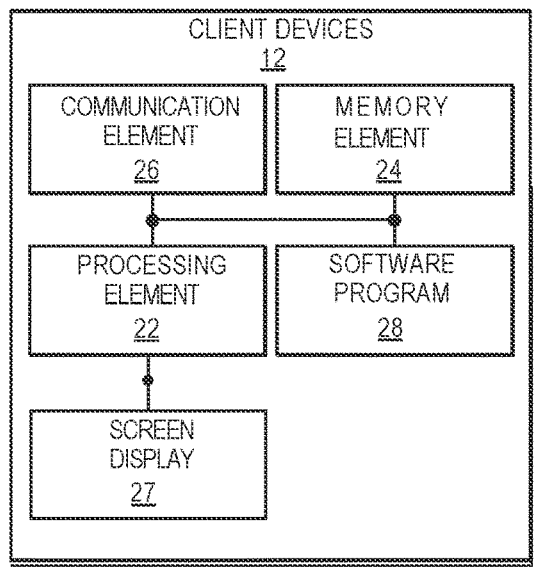
FIGS. 2, 3 and 4 illustrate various components of exemplary computing devices shown in block schematic form that may be used with the system of FIG. 1.
Figure 3:
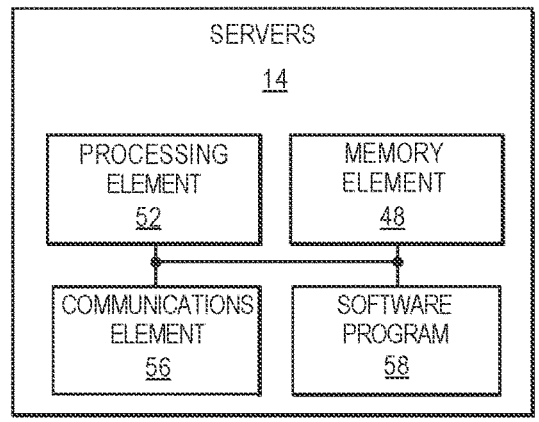
Figure 4:
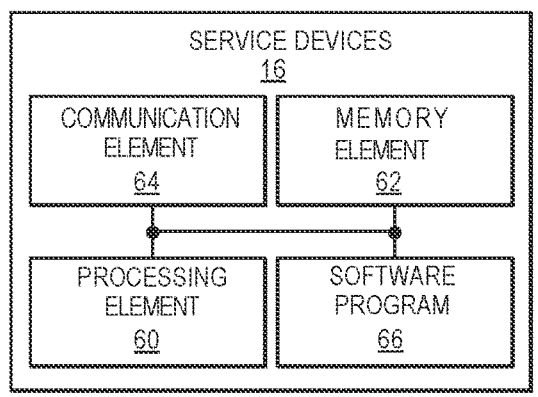

Turning to FIGS. 2 and 4, generally the client devices 12 and the service devices 16 may include tablet computers, laptop computers, desktop computers, workstation computers, smart phones, smart watches, and the like. In addition, the client devices 12 may include copiers, printers, routers and any other device that can connect to the communication network 20. In one or more devices, the client devices 12 and/or the service devices 16 may comprise servers, examples of which are discussed in more detail below.

Client devices 12 and service device 16 may each respectively include a processing element 22, 60, a memory element 24, 62, and circuitry capable of wired and/or wireless communication with the communication network 20, including, for example, a transceiver or communication element 26, 64. Each of the client devices 12 may additionally include a screen display 27, which may comprise a user interface of the client device 12. The display 27 may include video devices of any of the following types: plasma, standard or ultra-high-definition light-emitting diode (LED), organic LED (OLED), quantum dot LED (QLED), Light Emitting Polymer (LEP) or Polymer LED (PLED), liquid crystal display (LCD), thin film transistor (TFT) LCD, LED side-lit or back-lit LCD, or the like, or combinations thereof. The display 27 may possess a square or a rectangular aspect ratio and may be viewed in either a landscape or a portrait mode. In various embodiments, the display 27 may also include a touch screen occupying all or part of the screen.

Further, each of the client devices 12 and the service device 16 may include a software application or program 28, 66 configured with instructions for performing and/or enabling performance of at least some of the steps set forth herein. In an embodiment, the software programs 28, 66 each comprises instructions stored on computer-readable media of memory element 24.

The servers 14 generally receive requests and queries for data and provision of services and resources from the client devices 12 (e.g., in connection with normal operations of a business organization), and expose or otherwise provide such data, services and resources for monitoring, inspection, instrumentation and intervention by the service device 16. In one or more embodiments, the service device 16 enrolls all or some of the client devices 12 and servers 14 and/or the resources embodied thereby collectively as a network computing environment to be monitored by a security service managed by the service device 16.

The servers 14 may comprise cloud servers, domain controllers, application servers, database servers, database web servers, file servers, mail servers, catalog servers or the like, or combinations thereof. In an embodiment, one or more data sources (see FIG. 7) may be maintained by one or more of the servers 14. Generally, each server 14 may include a memory element 48, a processing element 52, a communication element 56, and a software program 58.

The communication network 20 generally allows communication between the client devices 12, the servers 14, and the service device 16, for example in conjunction with authentication framework and/or secure transmission protocol(s) discussed above, as well as in connection with data queries and service requests from the client devices 12 and/or data queries, instrumentation instructions and/or interventions from the service device 16.

The communication network 20 may include the Internet, cellular communication networks, local area networks, metro area networks, wide area networks, cloud networks, plain old telephone service (POTS) networks, and the like, or combinations thereof. The communication network 20 may be wired, wireless, or combinations thereof and may include components such as modems, gateways, switches, routers, hubs, access points, repeaters, towers, and the like. The client devices 12 and/or servers 14 may, for example, connect to the communication network 20 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

The communication elements 26, 56, 64 generally allow communication between the client devices 12, the servers 14, the service device 16 and/or the communication network 20. The communication elements 26, 56, 64 may include signal or data transmitting and receiving circuits, such as antennas, amplifiers, filters, mixers, oscillators, digital signal processors (DSPs), and the like. The communication elements 26, 56, 64 may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the communication elements 26, 56, 64 may utilize communication standards such as ANT, ANT+, Bluetooth™ low energy (BLE), the industrial, scientific, and medical (ISM) band at 2.4 gigahertz (GHz), or the like. Alternatively, or in addition, the communication elements 26, 56, 64 may establish communication through connectors or couplers that receive metal conductor wires or cables, like Cat 6 or coax cable, which are compatible with networking technologies such as ethernet. In certain embodiments, the communication elements 26, 56, 64 may also couple with optical fiber cables. The communication elements 26, 56, 64 may respectively be in communication with the processing elements 22, 52, 60 and/or the memory elements 24, 48, 62.

The memory elements 24, 48, 62 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory elements 24, 48, 62 may be embedded in, or packaged in the same package as, the processing elements 22, 52, 60. The memory elements 24, 48, 62 may include, or may constitute, a "computer-readable medium." The memory elements 24, 48, 62 may store the instructions, code, code segments, software, firmware, programs, applications, apps, services, daemons, or the like that are executed by the processing elements 22, 52, 60. In an embodiment, the memory elements 24, 48, 62 respectively store the software applications/program 28, 58, 66. The memory elements 24, 48, 62 may also store settings, data, documents, sound files, photographs, movies, images, databases, and the like.

The processing elements 22, 52, 60 may include electronic hardware components such as processors. The processing elements 22, 52, 60 may include digital processing unit(s). The processing elements 22, 52, 60 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing elements 22, 52, 60 may generally execute, process, or run instructions, code, code segments, software, firmware, programs, applications, apps, processes, services, daemons, or the like. For instance, the processing elements 22, 52, 60 may respectively execute the software applications/programs 28, 58, 66. The processing elements 22, 52, 60 may also include hardware components such as finite-state machines, sequential and combinational logic, and other electronic circuits that can perform the functions necessary for the operation of the current invention. The processing elements 22, 52, 60 may be in communication with the other electronic components through serial or parallel links that include universal busses, address busses, data busses, control lines, and the like.

Data queries or requests for services may be initiated via user applications embodied, controlled and/or executed by client devices 12 and/or the service device 16. In an embodiment, access to user applications, the client devices 12 and/or the service device 16 is granted via the authentication framework outlined above, such as through known single sign-on (SSO) processes.

Data sources hosted by the servers 14 may utilize a variety of formats and structures within the scope of the invention. For instance, relational databases and/or object-oriented databases may embody the data sources, and may be exposed for queries by one or more corresponding application programming interfaces (APIs). One of ordinary skill will appreciate that—while examples presented herein may discuss specific types of operating systems and/or databases—a wide variety may be used alone or in combination within the scope of the present invention.

In a preferred embodiment, the software program 58 of one or more of the servers 14 may translate data from the authentication management framework into identity information for use in connection with authenticating individuals or end users for access to data and services. The identity information may be used, for example, to determine the access rights enjoyed by the end user through reference to a permission store such as an access database and/or one or more authentication/authorization databases maintained by servers 14. One of ordinary skill will appreciate that a variety of user information—including, without limitation, credentials—may comprise and/or be used to generate the identity information within the scope of the present invention. It is foreseen that the program 58 may function in connection with a variety of authentication frameworks without departing from the spirit of the present invention.

The permission store may comport with role-based access control, discretionary access control, mandatory access control, other access control strategies and/or combinations thereof without departing from the spirit of the present invention. One of ordinary skill will appreciate that various structures for maintaining access control lists, groupings and/or permissions carry unique advantages and disadvantages. Moreover, the maintenance and storage of such access management frameworks may be dispersed across various components of the platform of embodiments of the present invention and/or the servers 14 without departing from the spirit of the present invention. One of ordinary skill will appreciate that embodiments of the present invention may vary in the structure and disposition of access control mechanisms utilized for querying databases.

The program 58 may permit an administrator to grant user access to particular users, devices, user applications and/or groups of user applications. For example, the program 58 may permit an administrator of the exemplary business organization to grant the service device 16 and/or a service provider employee of the corresponding security service access to those aspects of the client devices 12 and servers 14 which comprise the network computing environment to be monitored under the access management framework. One of ordinary skill will appreciate that the software program 28 of one or more of the client devices 12 may similarly manage access by the service device 16 to aspects of the client devices 12 and/or data stored thereby, particularly where such aspects form a part of or relate to the monitored network computing environment.

In one or more embodiments the service device 16 implements a security service that includes monitoring of and/or intervention into a network computing environment embodied by aspects of the client devices 12 and/or servers 14. Activity occurring in the network computing environment may include any change or group of state changes in that network such as, for example, movement of data, issuance or receipt of a request or command, inclusion or exclusion of a physical device, granting of permission or access rights, creation or deletion of a logical or virtual partition or entity, establishment or deletion of a communication channel, and any other state change(s) within the network computing environment. Entities in the environment include actors that may act or be acted upon within the network computing environment, and/or that are impacted by state change(s), and/or that may trigger or be involved in the performance of an activity, such as, for example, resources (including assets, physical devices, databases, virtual devices, communication channels, API gateways, etc.), user(s) or other person(s), buckets, access keys, user account(s), roles, regions, functions, IP addresses, and other actors that may be involved in an activity.

In a preferred embodiment, the program 66 is configured to automatically discover, enumerate, classify and expose resources, entities and relationships within the network computing environment, including by making primarily automatic adjustments for newly-discovered entities and relationships. The program 66 is further configured to increase entity resolution and enable improved identity tracing through dynamic graph database modeling and natural language processing.

In a preferred embodiment, the security service and/or service device 16 may construct statements or commands that automatically place blocks or restrictions on or otherwise alter activity of entities in the network computing environment, the client devices 12 and/or the servers 14 if one or more criteria are satisfied. For example, periodically or on a continual, rolling basis, the program 66 may evaluate system events, system logs, and/or network traffic for the occurrence of events of interest. An event of interest may trigger the block, restriction or other alteration (e.g., with respect to an associated end user or other entity). Related embodiments are discussed in more detail below. Events of interest may include end user behavior or any other activity—whether considered singly or in combination with other activities and/or over time—on the network that may warrant further observation and/or intervention such as, for example, where it is indicative of inauthentic access, access exceeding normal work needs, abnormal access(es), unauthenticated access(es), or other undesired data access events and/or malware.

A notification to an owner or administrator (e.g., at a screen display of a client device 12) may be automatically composed by the program 66 in relation to an event of interest or activity of concern, and may include: information regarding the triggering activity of concern within the network computing environment; information regarding why the activity is of concern; one or more proposed enabled action programs and links for executing same; and other useful information or functions. One of ordinary skill will appreciate that the automatically-generated contents of the notification may vary within the scope of the present invention.

In one or more embodiments, the program 66 is configured to automatically observe and analyze events occurring within the network computing environment and to implement verification protocols for a subset thereof. The verification protocols may include automated enrollment of and communications with candidate verifiers initially identified by the account owner, and subsequent verification processes with enrolled verifiers.

In a preferred embodiment, the program 66 is also configured to automatically (i.e., without human intervention) construct an enabled action program to apply an intervention prescribed for an event of interest. An administrator using a client device 12 (e.g., an administrator of the exemplary business organization) may then be presented with the option of activating the enabled action program, as discussed in more detail below.

One of ordinary skill will appreciate that the specific mechanism for applying an intervention to an entity within a network computing environment in connection with an anomalous or threatening activity or event, or with any other activity in the environment, may vary within the scope of the present invention.

In one or more embodiments, a service device 16 may also or alternatively intervene in the network computing environment to automatically and/or autonomously move one or more system state(s) toward a goal, for example to enhance system integrity and/or security.

Through hardware, software, firmware, or various combinations thereof, the processing elements 22, 52, 60 may—alone or in combination with other processing elements—be configured to perform the operations of embodiments of the present invention. Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The system may include additional, less, or alternate functionality and/or device(s), including those discussed elsewhere herein. The following detailed description is, therefore, not to be taken in a limiting sense. The scope of the present invention is defined only by the appended claims, along with the full scope of equivalents to which such claims are entitled, unless otherwise expressly stated and/or readily apparent to those skilled in the art from the description.

Figure 5:
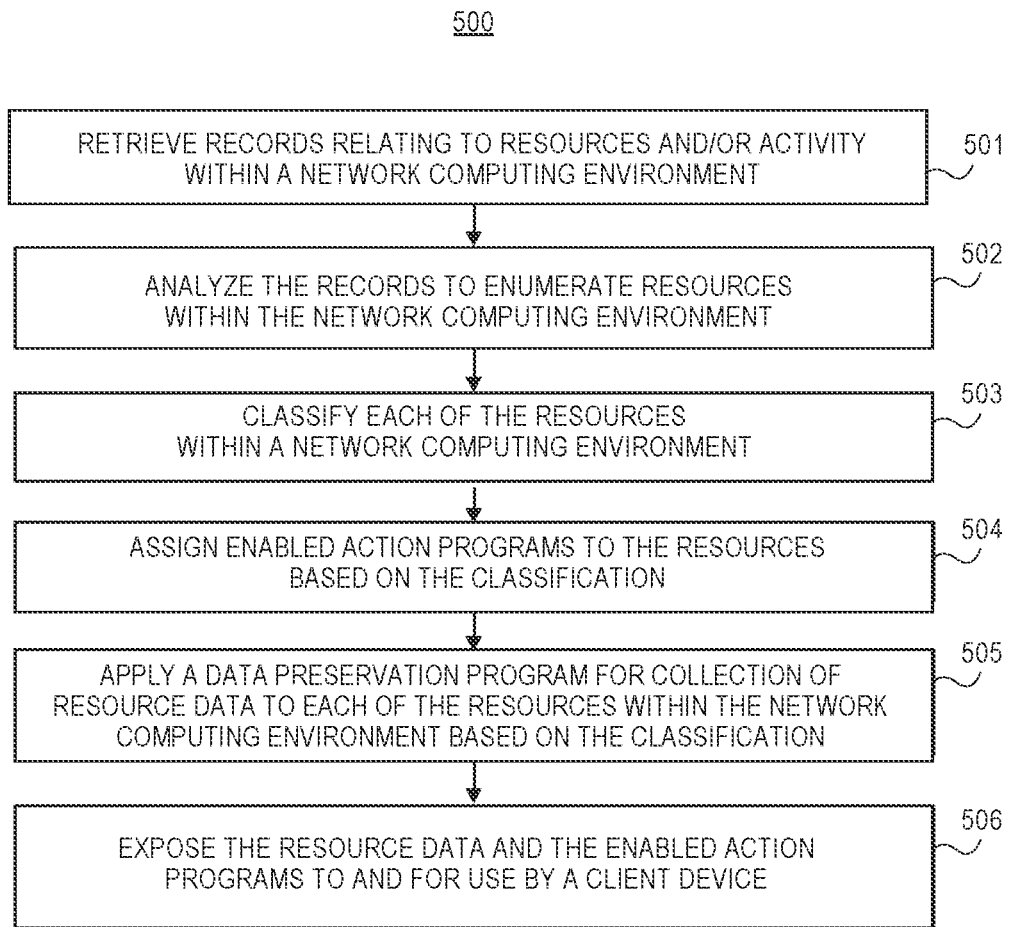
FIG. 5 illustrates at least a portion of the steps of an exemplary computer-implemented method for resource preservation and intervention in accordance with embodiments of the present invention.

Exemplary Computer-Implemented Method for Resource Preservation and Intervention FIG. 5 depicts a flowchart including a listing of steps of an exemplary computer-implemented method 500 for resource preservation and intervention. The steps may be performed in the order shown in FIG. 5, or they may be performed in a different order. Furthermore, some steps may be performed concurrently as opposed to sequentially. In addition, some steps may be optional.

The computer-implemented method 500 is described below, for ease of reference, as being executed by exemplary devices and components introduced with the embodiments illustrated in FIGS. 1-4, 7 and 9. For example, the steps of the computer-implemented method 500 may be performed by the client devices 12, the servers 14, the service device 16 and the network 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 501, records relating to resources and/or activity within a network computing environment may be retrieved. In one or more embodiments, the records are data records containing data elements relating to the resources and/or activity. The data records may also comprise structured and labeled data. The records may relate to resources and/or activity in an exemplary network computing environment comprising one or more cloud computing accounts and/or cloud services hosted by a cloud service provider on behalf of a business organization. Exemplary cloud services may include one or more of Infrastructure-as-a-Service (IaaS), Platforms-as-a-Service (PaaS), and Software-as-a-Service (SaaS). The exemplary computing environment may also or alternatively encompass all or part of an internal network of the business organization comprising one or more client devices and resources.

The records may be obtained by a service device or client device implementing a security monitoring service for the business organization (in either case, the "monitoring device"). The monitoring device may retrieve the records from one or more data sources including, for example, database(s) managed by the monitoring device and/or by calling an application programming interface (API) with a request for the records. The API may, in one or more embodiments, be managed by a database management system of a client device or server of the business organization and/or of a server of the cloud service provider. The records may be retrieved continuously, intermittently, in response to a trigger and/or the passage of a pre-determined period of time without departing from the spirit of the present invention.

Retrieval of the records may follow and/or be triggered by setup for or enrollment by the business organization or client device in the security monitoring service. For example, in one or more embodiments an administrative employee or "owner" of the service may input instructions into a client device requesting enrollment in the monitoring service. Via user input, the owner may designate or identify, during the service enrollment process, the one or more physical and/or virtual/logical and computing components of the client devices and/or cloud service provider devices and/or the accounts, services and other environmental aspects that together comprise the "network computing environment" to be monitored. The owner may also provide access credentials or instruct or reconfigure corresponding access management framework(s) to permit the monitoring device(s) the requisite access to perform the monitoring service. The owner may further select one or more monitoring services and/or tier(s) of service for application to the network computing environment.

Other aspects of the owner setup process may be conducted in a manner known in the art. The owner setup process may, for example, be conducted via a web interface or the like managed by the monitoring device. The program of the monitoring device may prompt the owner to create an account and login credentials, select a service type, enter payment information, and otherwise provide information and input required to set up enrollment and monitoring services of the type(s) discussed herein.

Referring to step 502, the records may be analyzed to enumerate resources within the network computing environment. In one or more embodiments, the resources may comprise assets, physical devices, databases, virtual devices, communication channels, API gateways, or the like. Any element of the network computing environment to which an action or activity may be attributed, on which an action or activity may be performed, or that is otherwise logically partitioned within the network computing environment may be enumerated within the scope of the present invention.

In one or more embodiments, the monitoring device may enumerate the resources by parsing the records for classification. For example, where system logs, security information and event management (STEM) logs, threat intelligence or other records retrieved from the data source(s) comprise structured data, the monitoring device may pre-process the records by parsing them into groups and/or culling the records for relevant data elements supporting classification operations. One of ordinary skill will appreciate, however, that parsing may be unnecessary in embodiments of the present invention, such as to the extent an API call by the monitoring device to one or more resources in the network computing environment yields labeled listing(s) ready for registration. The monitoring device may also configure the network computing environment (e.g., the API) to periodically or continuously report updates or changes to listing(s) of resource(s).

Referring to step 503, the resources may be classified based on all or some of the data elements of the records. In one or more embodiments, the monitoring device may apply a set of criteria associated with each of a plurality of pre-defined categories of resources to the analyzed records. Application of the criteria may lead to classifying each resource within one of the pre-defined categories. For example, data elements of the records may fit criteria associated with APIs, databases, virtual machines, computing devices, communication channels, or other resource categories that may be found within the network computing environment. Wherever a sufficient match to the criteria is found, the corresponding resource may be classified in the corresponding pre-defined category or class.

Referring to step 504, enabled action programs may be assigned to the resources based on the classification. An enabled action program comprises computer-executable instructions for making a pre-determined change in the network computing environment—for example, to the behavior and/or capabilities of one or more resource(s) therein—automatically based on receipt of a corresponding user input activating the enabled action program. Examples of known commands and changes that may be included in or executed pursuant to an enabled action program include, without limitation: Stop, Start, Suspend, Shutdown, Remove, Delete, Move, Prevent, Copy, Backup, Restore, Install, Uninstall, Run, Collect, Acquire, Add/Remove/Change Policy, Isolate, and Quarantine.

In one or more embodiments, the monitoring device may be configured to retrieve, manage and/or update a list of possible enabled action programs corresponding to the class or category of each classified resource. For example, database resources may be associated with read/write permissions and an enabled action program may be configured to make modifications thereto (e.g., by limiting location of internet protocol (IP) addresses permitted to read and/or write, amount or types of data that may be accessed, timeframes of permitted access, or the like). For another example, a computing device resource may be associated with a shutdown enabled action program configured to initiate a shutdown procedure for the machine. In each case, the monitoring device may maintain and/or access a list of possible actions that may be performed on or changes that may be made to a resource according to its class.

One of ordinary skill will appreciate that the monitoring device implementing the security service may assign a subset of all possible actions within the corresponding class to a resource. The monitoring device may be configured to select only those actions that may conceivably impact system integrity or security goals from among all possible actions for inclusion in corresponding enabled action programs. For example, where a possible action on a resource is typically only effective where a corresponding resource (e.g., of a given configuration or operational aspect) is also found in the network computing environment, or conversely where the corresponding resource is absent, the monitoring device may apply a filter or rule configured to check for the presence or absence of the corresponding resource and accordingly exclude a corresponding enabled action program from generation and/or exposure to the owner or business organization (discussed in more detail below).

The monitoring device implementing the security service may also be configured to automatically or upon request generate the enabled action programs based on the possible (or selected) actions available for use on a given resource type or class. The enabled action program(s) may be automatically generated based on, for example, unique details of the network computing environment and/or of the resources populating the environment, using one or more templates for the enabled action programs as a guide. In one or more embodiments, the templates will set forth generally applicable commands, instructions, routines, scripts or the like, pre-configured for completing the action in question across a variety of environments, but will include markers or other signal elements indicating segments where customization for the environment is needed and/or data or computer-executable instructions are missing. The monitoring device may be configured to recognize the markers or signal elements, and to retrieve and insert or link the missing instructions or data to complete the program. Examples of missing code and/or data may include any of the following where required or recommended for successful execution of an enabled action program: definition of a syntax utilized by an API; access credentials; device name or unique identifier; IP address(es); metadata regarding stored data; network address(es); and/or other information unique to the environment or otherwise required for filling out a template to form an executable enabled action program.

The monitoring device may more generally be configured to retrieve additional data wherever required to support classification operations and/or generation or assignment of the enabled action program(s) corresponding to each resource. The monitoring device may also or alternatively be configured to retrieve additional data in response to observation of one or more activities in another network computing environment that share a common nexus with one or more resources within the network computing environment. Retrieval may be automatically initiated upon a determination that a classification and/or enabled action program generation or assignment operation cannot be completed without missing data, and/or that a common nexus is of a type and import justifying added data collection.

The monitoring device may rely on access credentials provided by the owner wherever necessary to retrieve additional data. For example, wherever a resource does not meet the criteria of any pre-defined category and/or cannot be initially classified because it meets the criteria of multiple such categories, and/or where additional data required to complete or assign an enabled action program is missing, the monitoring device may be configured to acquire the additional data.

In one or more embodiments, the monitoring device may activate or reconfigure an existing data collection function within the network computing environment and/or install a supplemental monitoring program for execution within or in communication with the network computing environment to report out and/or expose the missing or additional data. Also or alternatively, the monitoring device may call or set up a recurring call to an API of the network computing environment to obtain or retrieve the missing data.

Referring to step 505, a data preservation program may be applied, based on the classification, to each of the resources for collection of resource data within the network computing environment. A data preservation program comprises instructions for and/or specification of the collection of certain pre-determined types of data in the network computing environment.

In one or more embodiments, the monitoring device implementing the security service may be configured to retrieve the preconfigured data preservation program associated with the class of each classified one of the resources. For example, database resources may be associated with a data preservation policy requiring the corresponding management system to retain metrics such as average data read requests from external systems or user identification information. For another example, a computing device resource may be associated with a data preservation program requiring retention of data regarding any reboot event or sequence. In each case, the monitoring device may maintain and/or access the preconfigured data preservation programs for application against each of the classified resources.

Execution of a data preservation program against a corresponding one of the classified resources may comprise any or all of: adjusting data retention and/or computation policies at the service or client devices and/or at the servers of the cloud service provider; setting up and implementing additional API calls to the cloud service provider; activating or reconfiguring existing data collection function(s) within the network computing environment; and/or installing a supplemental monitoring program for execution within or in communication with the network computing environment to report out and/or expose data required by the data preservation policy. The data preservation program may include time limits for one or more aspects of corresponding data collection or exposure or be implemented indefinitely within the scope of the present invention.

Referring to step 506, the resource data and the assigned enabled action programs may be exposed to and for use by a client device. In one or more embodiments, the monitoring device will configure an API of the security service and/or the cloud service provider to provide representations of the pre-defined resource data and of the enabled action programs for each of the resources to the client device, and to receive and convey user input from the client device comprising selection of one of the enabled action programs. In this manner, the client device may enable, for example, the owner and/or other employees of the business organization to activate or execute one or more of the enabled action programs and to view and retrieve the resource data. In one or more embodiments, aspects of the data preservation program may also be subject to activation by such user(s) prior to collection of the corresponding resource data.

It should be noted that, in one or more embodiments, the owner will be permitted—e.g., via the web interface portal through which setup for the monitoring service was initially completed—to select one or more enabled action programs and/or data preservation programs suggested and/or configured by the monitoring device for implementation. For example, where data security concerns are too great to implement all aspects of a data preservation program recommended by the monitoring device, the owner may reduce exposure of corresponding data and thereby customize the data preservation program from the originally-recommended form. For another example, the owner may decline to put one or more enabled action program(s) into production in the monitoring service based on, for example, a subjective determination of the likelihood such program(s) will positively impact the goals of the monitoring service.

Moreover, once exposure has been achieved, the owner and/or other user(s) of the business organization may provide user input at one or more of the client devices instructing execution of the enabled action program(s) assigned to one or more of the resources in the network computing environment. In response to the user input, the monitoring device may execute the selected enabled action program to implement the pre-determined changes to the corresponding resource(s) within the network computing environment.

Further, in one or more embodiments, the monitoring device may be configured to automatically perform the steps of the computer-implemented method each time a record reflecting an unregistered or unclassified resource is received, thereby dynamically updating a register of classified resources.

It should be reiterated that a central goal of embodiments of the present invention is to provide a technological mechanism for resource preservation and intervention. Namely, embodiments of the present invention automatically classify resources within a network computing environment and select data preservation and enabled action programs that are customized for the network computing environment. This presents an improved method for providing visibility into operation of resources within the network computing environment and the ability for owner(s) or others administrating or participating in utilization of monitoring and/or verification service(s) to intervene in pre-determined and system-specific ways to preserve, for example, system integrity and security.

The method may include additional, less, or alternate steps and/or device(s), including those discussed elsewhere herein, unless otherwise expressly stated and/or readily apparent to those skilled in the art from the description.

Exemplary Computer-Implemented Method for Expanded Entity and Activity Mapping

Figure 6:
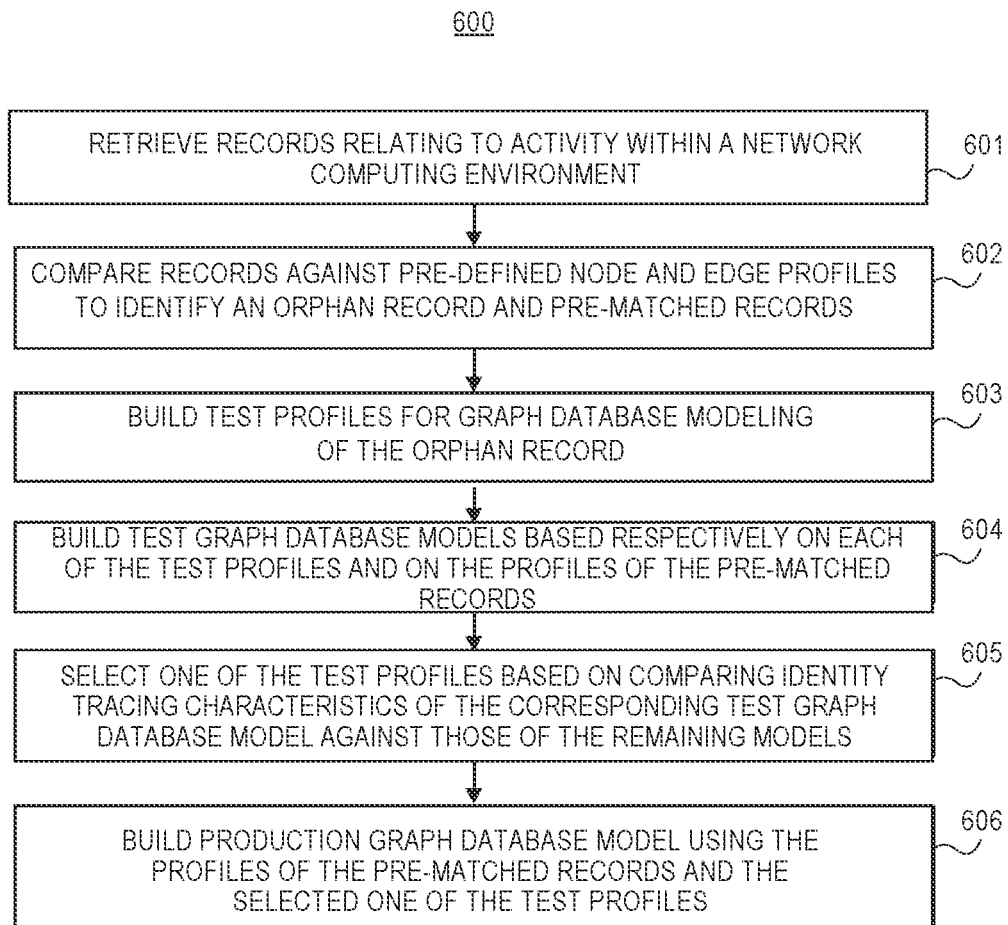
FIG. 6 illustrates at least a portion of the steps of an exemplary computer-implemented method for resolved and/or expanded entity and activity mapping in accordance with embodiments of the present invention.

FIG. 6 depicts a flowchart including a listing of steps of an exemplary computer-implemented method 600 for expanded entity and activity mapping. The steps may be performed in the order shown in FIG. 6, or they may be performed in a different order. Furthermore, some steps may be performed concurrently as opposed to sequentially. In addition, some steps may be optional.

The computer-implemented method 600 is described below, for ease of reference, as being executed by exemplary devices and components introduced with the embodiments illustrated in FIGS. 1-4, 7 and 9. For example, the steps of the computer-implemented method 600 may be performed by the client devices 12, the servers 14, the service device 16 and the network 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

In one or more embodiments, the computer-implemented method 600 may be performed at least in part by a monitoring device implementing a security monitoring service (discussed above). The monitoring device may implement the system illustrated in FIG. 7 in connection with performing steps of the computer-implemented method 600, as discussed in more detail below.

Figure 7:
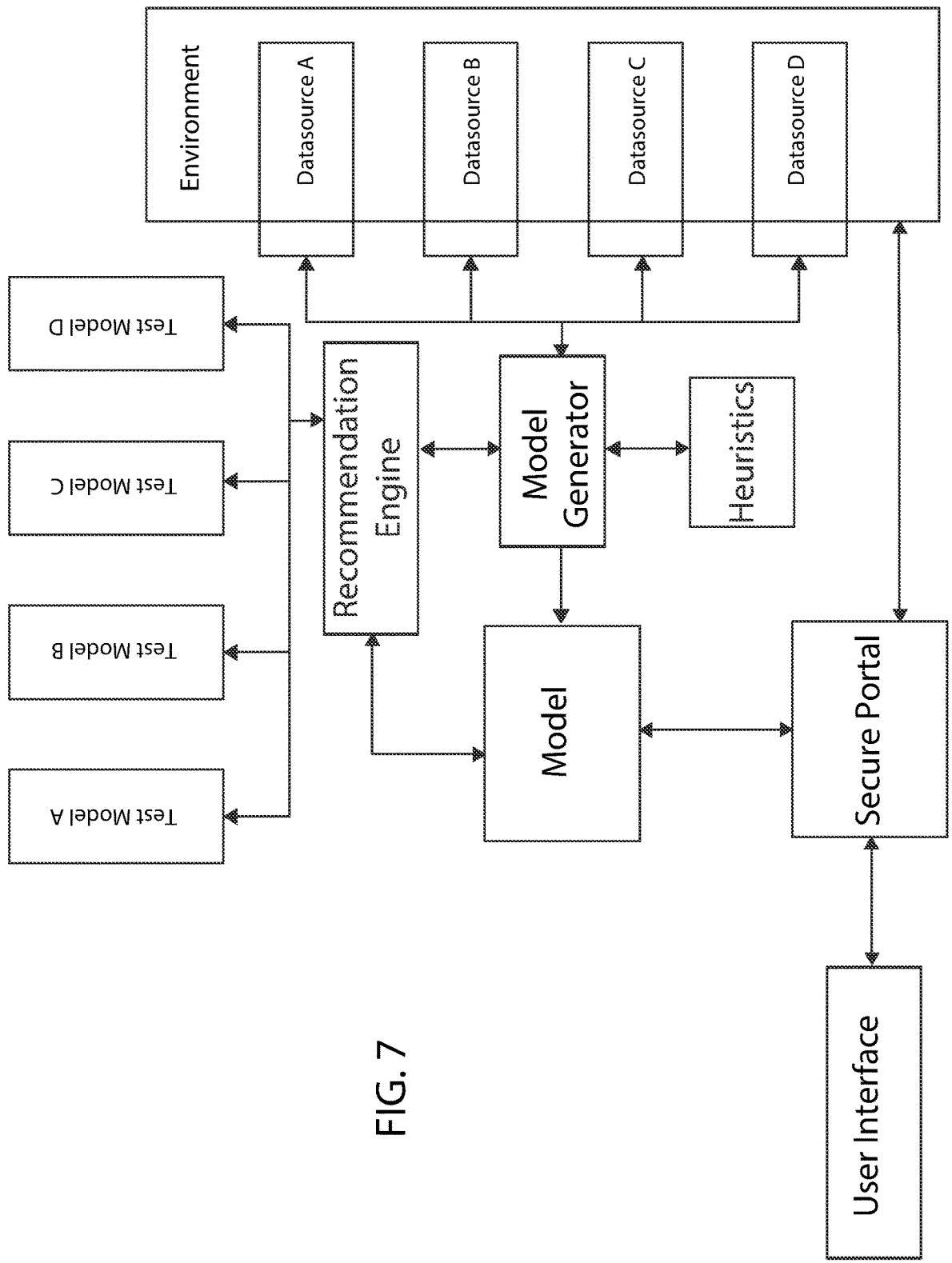
FIG. 7 is a flowchart of exemplary systems and components thereof for resolved and/or expanded entity and activity mapping, and of relationships and communication channels between the components, in accordance with embodiments of the present invention.

Referring to step 601, records relating to activity within the network computing environment may be retrieved. In one or more embodiments, the records may include records retrieved in connection with resource preservation and intervention according to computer-implemented method 500 discussed above. Further, the records may be retrieved from resources and/or data sources within the network computing environment such as those discussed in more detail above in connection with the computer-implemented method 500. Turning briefly to FIG. 7, the records may be retrieved from one or more of Data Sources A-D of the depicted environment. In one or more embodiments of FIG. 7, the secure portal, model, model generator, heuristics, recommendation engine and test models are managed by and/or hosted on the monitoring device and are discussed in more detail below.

Still further, the records may be retrieved through instrumenting the network computing environment to generate/expose previously-uncollected or previously-unexposed data, as discussed in more detail above. Yet still further, the records may be retrieved continuously, intermittently, and/or in response to a trigger and/or the passage of a pre-determined period of time, and may be preceded by owner enrollment processes, as discussed in more detail above. One of ordinary skill will appreciate, however, that record retrieval according to step 601 may occur independently of and/or may not be preceded by one or more of the steps outlined in connection with the computer-implemented method 500 without departing from the spirit of the present invention.

The records may comprise data elements, and may be structured. In one or more embodiments, the monitoring device may alternatively be configured to parse and label unstructured data for use in the computer-implemented method 600.

The monitoring device may be configured to recognize within the records data types (e.g., labels) fitting within any of "actor," "action" and "acted upon" categories. For example, a record may include multiple labeled data elements correlating to a subject (actor), verb (action) and target (acted upon). Exemplary verbs or actions corresponding to activities within the network computing environment include, without limitation: read/write operations, backup operations, transmissions, login attempts, execution of computer-readable instructions, creation or removal of an entity within the network computing environment, application of a restriction or permission to an entity within the network computing environment, and any other observable changes in state within the network computing environment.

In one or more embodiments, the monitoring device is configured to interpret a first data field of the record as identifying the "actor," a second data field as identifying the "action," and a third data field as identifying the "acted upon." The configuration may be based on known convention—such as where records obtained from a particular data source or class of resource are known to list actors first, and acted upon last, or where the labels themselves indicate the roll of each element—or may be learned by the monitoring device by observing the network computing environment.

The monitoring device may analyze records from each corresponding reporting resource or data source to determine a syntax or format utilized by the resource or data source in generating records (e.g., to discern which element(s) of a record from the resource or data source correlate to the "actor" and which to the "acted upon"). For example, the monitoring device may be configured to automatically compare multiple records relating to the same or similar events or activities within the network computing environment—such as where the records are retrieved from multiple different resource or data sources in the environment—to determine which entity was, in fact, the actor and which the acted upon. The comparison may include an analysis of constituent labeled data elements that, for example: (1) determines that the multiple records are reporting on or relate to the same action or event; (2) determines whether one of the records reports a data element known to relate to only one of an "actor" and an "acted upon" and/or uses an if/then process of elimination to compare the records and determine that one of the elements must correlate to one of the "actor" and the "acted upon"; and (3) upon identification of one or both of the "actor" and the "acted upon" for the event or activity in question, analyzes each corresponding record to discern a reporting format therefore. The monitoring device may store the determined syntax and/or format for use in interpreting future records received from each of the corresponding resources or data sources.

An entity may be any physical or virtual actor or acted upon element of the network computing environment. An entity may be any element of the network that can be described with identifying characteristics that persist across multiple encounters and/or across time (that is, the entity is recognizable upon a second encounter based on a first encounter). In one or more embodiments, an entity may be any resource (e.g., asset) within the network computing environment, and may be any person, account (e.g., associated with one or more person(s) or user(s)), access key, user, bucket, or other physical or virtual/logical element of the network computing environment meeting one or more of the definition(s) set out above. In one or more embodiments, delineation between entities may be driven by optimization of identity tracing characteristics of a database model discussed in more detail below.

Referring to step 602, the records may be compared against pre-defined node and edge profiles to identify an orphan record and pre-matched records. Returning briefly to FIG. 7, the model generator may store and/or retrieve the pre-defined node and edge profiles from the model.

Data elements of the records may be referred to as "graph elements" when incorporated into a graph database model of embodiments of the present invention. The graph database model may include nodes, edges and properties of the nodes and/or edges, and may be constructed from records of the network computing environment to optimize identity-tracing characteristics discussed in more detail below. The graph database model and/or the graph database from which the model is generated may be distributed across one or more computing devices, such as one or more of the client device(s), service device and/or cloud server(s).

Nodes of the graph database may correspond to entities and edges may correspond to actions, activities or other relationships within the network computing environment. However, it should be noted that entities may be modeled as edges and actions, activities and/or relationships as nodes without departing from the spirit of the present invention. For ease of description, discussion herein will focus on embodiments treating entities as nodes and actions, activities or other relationships as edges.

Each pre-defined node profile essentially comprises a set of instructions for how to represent or model an entity within the graph database model. For example, the node profile may: include a list of entity types covered by the profile; list one or more data elements to be used in the model to represent or differentiate a particular entity from other entities of the network computing environment; list one or more properties (e.g., additional data or metadata relating to the entity or corresponding node) that should be stored and/or retrieved for use in the graph database model; list one or more edge types (e.g., relationship or activity types) that should be connected to the node, including by defining any directionality the edge(s) may possess; and otherwise provide a definition for how the monitoring device should represent the entity and connected interrelationships within the graph database model.

Likewise, each pre-defined edge profile essentially comprises a set of instructions for how to represent or model an action or activity (or other relationship) within the graph database model. For example, the edge profile may: include a list of relationship types covered by the profile; list one or more data elements to be used in the model to represent or differentiate a particular relationship from other relationships within the network computing environment; list one or more properties (e.g., additional data or metadata relating to the edge) that should be stored and/or retrieved in connection with the edge for use in the graph database model; list one or more node types (e.g., entity types) that should be connected to the edge; and otherwise provide a definition for how the monitoring device should represent the edge and connected interrelationships within the graph database model.

Matching the records against the pre-defined node and edge profiles may include extracting data elements from the records that are representative of unique entities or relationships and/or of types of entities or relationships. It should also be noted that, in one or more embodiments, extraction may be unnecessary where rendered duplicative or unnecessary by preceding or simultaneous resource enumeration processes discussed above in connection with the computer-implemented method 500. The matching may further include classifying unique entities or relationships, particularly where the extracted data elements reflect unique identifying information for an entity or relationship but are not easily classified within a type or category covered by a profile.

For example, a record may reflect that a cloud user account AA requested read access to a relational database DB on date DA. Where the monitoring device and pre-defined node profiles are configured to match at a level of abstraction corresponding to "cloud user account" and "relational database," no further classification operation may be necessary for the matching operation to be completed. However, where the monitoring device and pre-defined node profiles are configured to match at a higher level of abstraction—e.g., at "user account" and/or "database" levels—the monitoring device may be configured to analyze and perform further classification operations sufficient to complete matching against the pre-defined node profiles. Analogous principles apply to matching against pre-defined edge profiles.

In one or more embodiments, additional data elements may be extracted for use in the matching operation. For example, wherever an entity does not readily fit into a list of covered entities of a pre-defined node profile—such as where available data does not readily identify it as a "user account," "database" or other covered entity type—the monitoring device may be configured to rely on data elements comprising secondary indicia of entity type. Secondary indicia may relate to, for example, when an entity acts within the network computing environment, which elements the entity acts on or receives actions from, what actions the entity performs, or other such factors. In one or more embodiments, whenever available data regarding an entity satisfies a threshold or pattern of such secondary indicia, the entity may be matched to the pre-defined node profile. Analogous principles apply to matching relationships reflected in records against pre-defined edge profiles.

The pre-matched records are those reflecting entities and relationships that satisfy the matching operations outlined above for one or more of the pre-defined node and edge profiles. That is, the entities and relationships of the pre-matched records sufficiently match the corresponding pre-defined node and edge profiles to be modeled according to those profiles within the graph database model.

An orphan record, on the other hand, reflects or describes an entity or relationship that does not sufficiently match to a pre-defined node or edge profile. That is, the non-matching entity or relationship is of a type that is not covered by any of the pre-defined node and edge profiles, for example because labeled data elements do not sufficiently place it within one of such profiles or because secondary indicia data elements relating to behavior within the network computing environment do not adequately match behavior of a known type of entity or relationship as represented by the profiles.

Moreover, the heuristics component of FIG. 7 may supply the pre-defined rules and heuristics for comparing data records against pre-defined node and edge profiles discussed in more detail above. It should also be noted that an orphan record is one which reflects at least one entity or relationship that does not match to a corresponding one of the pre-defined node and edge profiles. The orphan record may also reflect one or more entities or relationships that do match a corresponding one of the predefined node and edge profiles without departing from the spirit of the present invention (such as where an actor does not match an existing profile, but the corresponding action and target do match corresponding pre-defined edge and node profiles).

Referring to step 603, a plurality of test profiles may be built or generated for graph database modeling of the orphan record. In one or more embodiments, all or some of the test profiles may respectively be automatically built by borrowing parts from pre-defined profiles that were determined to be closely matched during the preceding comparison step 602 or, in other words, were selected from a pool of candidate test profiles based on similarity. For example, the monitoring device may be configured to build a first test profile based partly or completely on a pre-defined profile with a closest comparison score with respect to secondary indicia (i.e., observed behavior within the environment) as determined in connection with step 602. It is foreseen that the first test profile may also be built through fragmented analysis and comparison, such as where a first aspect of the first test profile (e.g., unique identifying data) is derived from a closest match among the candidate profiles along a first dimension, whereas a second aspect of the first test profile (e.g., corresponding properties of the edge or node) is derived from a different closest match among the candidate profiles along a second dimension. Accordingly, the test profile may be based on or derived from one or more than one of the pre-defined profiles.

In one or more embodiments, the comparison against candidate test profiles may include all or some of the following: comparing a subject-verb-target pattern of the data elements of the orphan record to subject-verb-target patterns of each of the pool of candidate test profiles, relating a subject of the data elements of the orphan record to a representative subject of each of the pool of candidate test profiles, relating a verb of the data elements of the orphan record to a representative verb of each of the pool of candidate test profiles, and/or relating a target of the data elements of the orphan record to a representative target of each of the pool of candidate test profiles.

Also or alternatively, all or some of the test profiles may be built using machine learning programs or techniques. For instance, the monitoring device may utilize information from records collected before and after implementation of prior profiles for graph database modeling of the network computing environment to develop correlations between aspects of the prior profiles and an increase or decrease in identity tracing characteristics of the graph database model. For example, if a recent generation of profiles mostly collapsed certain entity subtypes under a single profile in connection with graph database modeling, and the machine learning program observed a decrease in identity-tracing characteristics of the resulting graph database model, the program may note that entities of several subtypes exhibiting similar secondary indicia behavior within the network computing environment may be better modeled separately and independently rather than being collapsed under one profile.

The machine learning program(s) of the monitoring device may therefore recognize or determine correlations between graph database profile characteristics on the one hand, and identity tracing characteristics of resulting graph database models on the other hand. The machine learning techniques or programs may include curve fitting, regression model builders, convolutional or deep learning neural networks, combined deep learning, pattern recognition, or the like. Based upon this data analysis, the machine learning program(s) may learn method(s) for constructing edge and node profiles for use in building graph database models to optimize identity tracing characteristics.

It should be noted that, in supervised machine learning, the program may be provided with example inputs (i.e., prior profiles) and their associated outputs (i.e., better or worse identity tracing characteristics when relied on in modeling), and may seek to discover a general rule that maps inputs to outputs for improved construction of potential test profiles. In unsupervised machine learning, the program may be required to find its own structure in unlabeled example inputs.

The program may utilize classification algorithms such as Bayesian classifiers and decision trees, sets of pre-determined rules, and/or other algorithms to generate test profiles. In one or more embodiments, the recommendation engine illustrated in FIG. 7 generates the test profiles described above.

The monitoring device may accordingly generate a plurality of test profiles for use in modeling the orphan record. Each test profile is unique relative to the others for a given orphan record, entity or relationship, but the uniqueness may extend to only a few or one of the definitional elements of the test profile (or, possibly, to more or even all definitional elements).

Referring to step 604, test graph database models may be built based respectively on each of the test profiles and on the profiles of the pre-matched records. In one or more embodiments, a separate test graph database model is constructed for each of the test profiles based on the respective test profile and the profiles of the pre-matched records. Accordingly, a plurality of test graph database models is built to test efficacy of a single orphan record or corresponding entity or relationship (i.e., node or edge).

It should be noted that, in one or more embodiments, test profiles for multiple orphan entities and/or relationships may be tested together within corresponding test graph database models without departing from the spirit of the present invention. For example, where modeling occurs in batches, a plurality of orphan records—each associated with a plurality of test profiles—may accumulate and be tested together in multiple possible combinations in connection with selecting a new production graph database model (discussed in more detail below). Accordingly, a single test profile may be utilized in a plurality of test graph database models for simultaneous testing and optimization within the scope of the present invention, such as where the test profile is tested with different combinations of test profiles corresponding to other of the orphan entities and/or relationships.

The test graph database models corresponding to the test profiles may be built, for example, by modeling each known node and edge within the network computing environment according to its corresponding pre-defined profile (or test profile, in the case of orphan entities and/or relationships). One of ordinary skill will appreciate that some entities and/or relationships may be excluded or culled from the models, for example where they are known to be inconsequential with respect to identity tracing characteristics (at least in the context of test models) and to save on computational and/or memory requirements for modeling.

It should also be noted that at least some test profiles may be generated that impinge on or reduce the scope or reach of an existing pre-defined node or edge profile and/or that collapse entirely together with such a pre-defined node or edge profile into a new, more broadly applicable test profile. Accordingly, one or more test graph database models may model at least one entity or relationship from a pre-matched record using a test profile instead of under the originally-matched pre-defined node or edge profile. Likewise, testing one or more test profiles or models may include splitting out or modifying other pre-defined node or edge profiles without departing from the spirit of the present invention.

Referring to step 605, one of the test profiles may be selected based on comparing identity tracing characteristics of the corresponding test graph database model against those of the remaining test graph database models. In one or more embodiments, the monitoring device is at least in part tasked with optimizing identification of certain types of entities or actors within the network computing environment to enhance control by the owner over the environment and threats to system and data integrity and security that may be present therein.

Identity tracing characteristics may include, for example, one or more of: number of non-redundant edges between distinct nodes, number of identifiable entities, level of resolution of identifiable entities, number of activities traceable to at least one identity, visibility for discovery of new identities, minimized number of edge traversals between identity nodes and an edge of interest, low fidelity of model, high retention of model, and low number of edges. In one or more embodiments, aspects of the model that most strongly enrich the relationships between entities may be determined using data dimensionality reduction techniques common to machine learning embedding techniques. One of ordinary skill will appreciate that competing concerns over computational and memory requirements on the one hand, and data clarity and resolution (i.e., enriched resolution in the relationships between nodes and edges within the model) on the other hand, may at times bring some identity tracing characteristics into tension with others. However, it has been observed that most environments, when modeled using embodiments of the present invention, will see an improved balance for these identity tracing characteristics.

Examples of identities of interest may include any one or more of the following: unique individual identification, unique account identification, unique IP address identification, unique device identification, unique system identification, or the like. It should be noted that it is generally desirable to provide a more granular identification—for example, by identifying a person rather than an account which may be used by multiple persons that include the person—but that maximum resolution may be unnecessary in certain environments.

The identity tracing characteristics of each of the multiple test graph database models may be compared to those of the others to select the best test graph database model—and, correspondingly, the best test profile under the exemplary embodiment—for use in a production graph database model discussed in more detail below. Returning briefly to FIG. 7, the recommendation engine of the monitoring device may perform the test model evaluation and may select the test profile correlating to the best identity tracing characteristics.

Referring to step 606, the production graph database model may be built using the selected one of the test profiles and the pre-defined profiles of the pre-matched records. In one or more embodiments, as with the test graph database models discussed above in connection with steps 604-605, the production graph database model may be built by modeling all or a subset of the entities and relationships enumerated within the network computing environment. Once included in a production graph database model, the selected test profile may be considered one of the pre-defined node and edge profiles for subsequent test iterations and dynamic modeling cycles. Turning briefly to FIG. 7, the model may be representative of the production graph database model hosted and/or managed by the monitoring device.

The production graph database model may be used to model the network computing environment unless and until dynamically updated based on one or more later-selected test profiles and/or other refinements that may continuously or periodically occur. As noted above, the production graph database model may, in embodiments of the present invention, be optimized for providing high entity resolution and for automated expansion to encompass new entity types within new environments, while mitigating the impact of increasing model complexity on computational and memory requirements. Embodiments of the present invention accordingly represent marked improvement over existing technology for dynamic modeling of and intervention into network computing environments.

As illustrated in FIG. 7, the model or representations thereof may be accessible or exposed to an owner or employee at a client device (i.e., the "User Interface") via a secure portal or web portal such as the portal used for enrollment and/or setup of the monitoring service discussed in more detail in preceding sections.

It should be reiterated here that, in one or more embodiments, the monitoring device may instrument the network computing environment to obtain, retrieve and/or generate/expose previously-uncollected or previously-unexposed data. Such instrumentation may rely on access credentials supplied during enrollment by the owner in the monitoring service. For example, the instrumentation may have as its aim the exposure of data relating to creation of a new resource or to occurrence of additional activity of specified type and/or enabling an expanded scope of monitoring of at least one cloud computing account and/or cloud service type. Expanded scope of monitoring may be implemented in response to a determination that the expanded scope is required to analyze activity observed within the network computing environment.

Moreover, the instrumentation may be triggered and/or be responsive to one or more of: (1) a need for additional information to complete selection of one of the first and second test profiles; and (2) a need for additional information to complete the application of the pre-processing rules to compare the data records against the plurality of pre-defined profiles. The additional data collected may be utilized to, for example, support the operations of the heuristics and/or recommendation engine components described in more detail above.

In one or more embodiments, the monitoring device is further configured to enrich the production graph database model. Analyzer(s) comprising programs configured to recognize one or more data types or values—alone or in pre-defined combination(s)—will walk, traverse or otherwise analyze the foundational construction of the production graph database model looking for opportunities to enrich the identity tracing characteristics thereof. More particularly, where the foundational construction (i.e., profiling) is already established via steps 601-606 discussed above, the analyzers may walk the production graph database model looking for additional changes to be made to enhance the model for better identity resolution and/or attribution of one or more activities to a given identity. For example, the analyzers may identify occurrence of one or more pre-determined patterns or data types and, based on identifying the occurrence, may enrich or add data to the model. The added data may, for example, comprise adding IP addresses to domain nodes or adding other properties to nodes or edges, generating subgraphs, or adding nodes or edges excluded during initial generation of the production graph database model.

The analyzer(s) may also or alternatively generate a notification for near-term consideration by the owner of the security monitoring service. For example, the analyzer may identify an event in the production graph database model classified as being of concern or interest and may, accordingly, generate a descriptive notification for transmission and display to the owner.

The analyzer(s) may additionally perform a transform step operating on one or narrative(s) derived from the production graph database model, discussed in more detail below. The transform step may include application of one or more grammatical rules at the narrative level to improve readability of the narrative in view of the available data from the production graph database model.

It should be noted that one or more of the analyzer(s) described above may also be customized for use and stored together with the production graph database model. In this manner, the customized analyzer(s) may be dynamically executed with and may form part of the production graph database model.

It should also be noted that all or some of the enrichment and other analyzer operations discussed above may be supported by and/or may require instrumentation of the network computing environment and/or retrieval of other additional data, again as discussed in more detail above. Further, the narrative(s) generated according to embodiments of the present invention may be ranked according to importance, with such ranking being utilized to prioritize presentation to one or more user(s) at a client device. Still further, the monitoring device may be configured to apply pre-determined rules to rank natural language narratives by level of abstraction, based on a pre-determined priority corresponding to the type of event or activity of interest being reported.

The method may include additional, less, or alternate steps and/or device(s), including those discussed elsewhere herein, unless otherwise expressly stated and/or readily apparent to those skilled in the art from the description.

In one or more central embodiments, for example, the method may include generating or preparing to generate one or more natural language narratives representative of activity, entities and/or relationships embodied in the production graph database model. The monitoring device may be configured to walk or otherwise analyze the production graph database model to identify a region of interest within the model that matches pre-defined criteria. The region of interest may include data elements relating to a prior action or activity occurring within the network computing environment and involving first and second entities. The pre-defined criteria may include one or more pre-determined patterns or data types in the production graph database model that are required to generate a natural language narrative regarding an activity within the network computing environment.

It should be noted that construction of the graph database model described in more detail above and relying on sub-ject-verb-target-oriented formatting, is particularly useful for application of language processing to generate natural language narratives relating activities within the network computing environment. For example, the production graph database model may be constructed with entities correlating to nodes and actions, activities or other relationships correlating to edges, such that language processing rules may more readily recognize directionality, weighting and other properties of edges and more easily generate natural language narratives at least partly comprising sentences having the subject-verb-target format.

The monitoring device may be configured to recognize and copy portions of the production graph database model anticipated to be useful in generating natural language narratives, including without limitation portions that are useful in completing computations required to complete natural language narratives at a high level of abstraction. For example, one or more language processing rules may be configured to generate abstracted natural language narratives representative of activity occurring within the computing network environment at a high (or summary-type) level of abstraction. Such narratives may preferably include a count of the number of occurrences of the activity within a given timeframe, within a given area of the network computing environment, or involving a given entity.

Accordingly, the analyzers may analyze the production graph database model to identify areas likely to include data elements required to support such computations for future narrative generation, and may preemptively pull or copy those portions of the model for future use. In one or more embodiments, this includes capturing a subset of the data or graph elements available in the model, the subset representing a portion of the model filtered according to at least one of identity-based slices, time-based slices and entity-based slices. The filtered data may be further processed through retrieval by the monitoring device of missing or supplemental additional data that may be required or recommended for completing corresponding narrative(s). Such preemptive sampling of the model may improve performance and reduce computational requirements.

Additional embodiments of and uses for natural language narratives in connection with a security monitoring service are discussed in more detail below.

Figure 8:
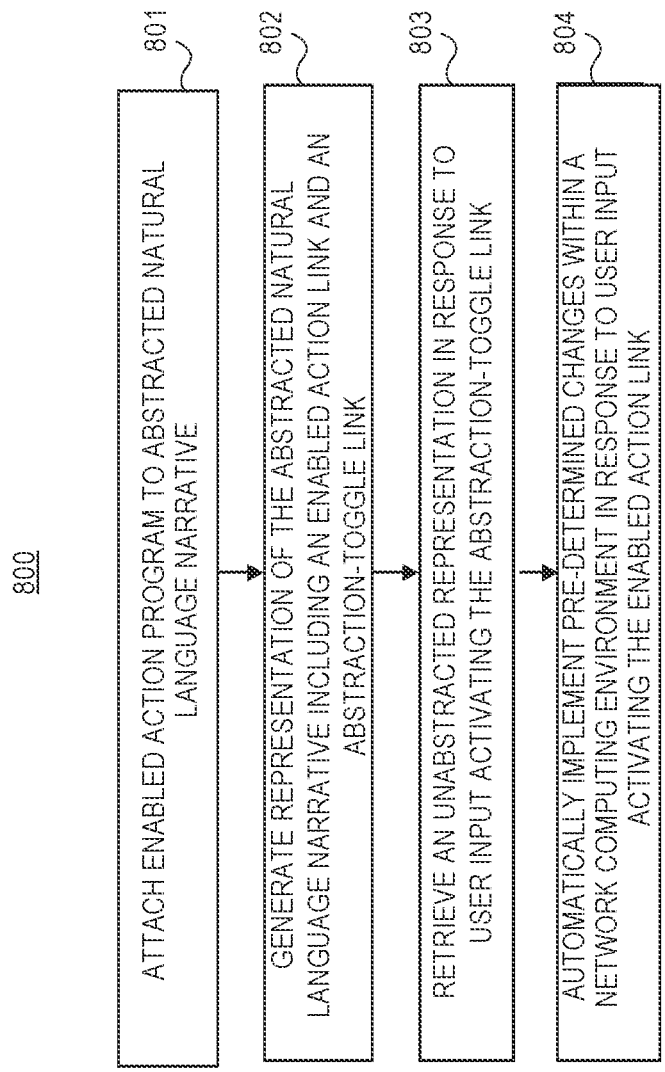
FIG. 8 illustrates at least a portion of the steps of an exemplary computer-implemented method for narrative-structured representation of and intervention into a network computing environment in accordance with embodiments of the present invention.

Exemplary Computer-Implemented Method for Narrative-Structured Representation of and Intervention into a Network Computing Environment FIG. 8 depicts a flowchart including a listing of steps of an exemplary computer-implemented method 800 for narrative-structured representation of and intervention into a network computing environment. The steps may be performed in the order shown in FIG. 8, or they may be performed in a different order. Furthermore, some steps may be performed concurrently as opposed to sequentially. In addition, some steps may be optional.

The computer-implemented method 800 is described below, for ease of reference, as being executed by exemplary devices and components introduced with the embodiments illustrated in FIGS. 1-4, 7 and 9. For example, the steps of the computer-implemented method 800 may be performed by the client devices 12, the servers 14, the service device 16 and the network 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 801, an enabled action program may be attached to an abstracted natural language narrative. In one or more embodiments, the enabled action program may be automatically constructed in accordance with, and may instruct pre-determined changes to entities or resources discussed in connection with, the computer-implemented method 500 discussed above. Further, the natural language narrative may be constructed based on and in the manner described in connection with the computer-implemented method 600 discussed in more detail above. Still further, the natural language narrative may relate structured data embodied within a production graph database model of a network computing environment in accordance with the description of the computer-implemented methods 500, 600. One of ordinary skill will appreciate, however, that step 601 and subsequent steps of the method 600 may occur independently of and/or may not be preceded by one or more of the steps outlined in connection with the computer-implemented methods 500, 600 without departing from the spirit of the present invention.

Figure 9A:
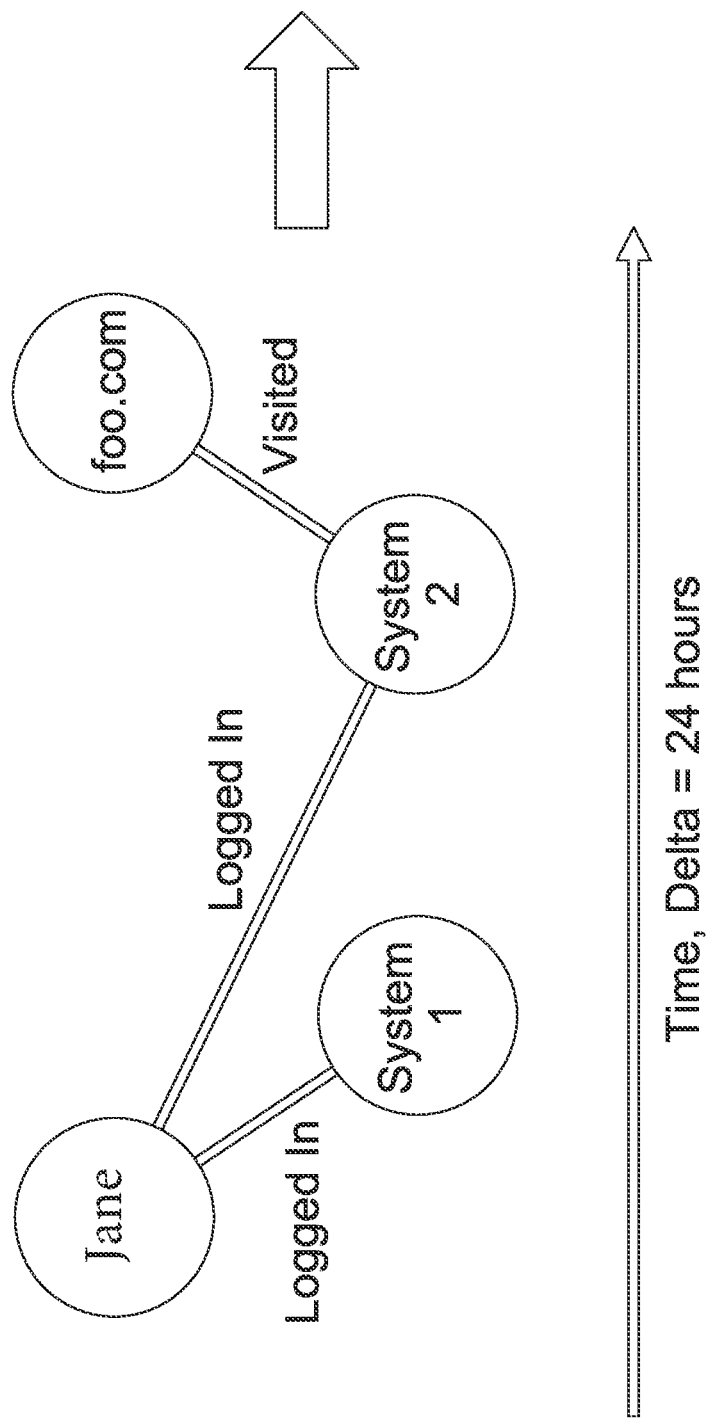
FIG. 9A illustrates a graphical representation of nodes and edges of a graph database model in accordance with embodiments of the present invention.

In one or more embodiments, the abstracted natural language narrative may be constructed from a subgraph or filtered portion of a production graph database model of a network computing environment, which, again, may be in accordance with the more detailed discussion of method 600 above. Turning briefly to FIG. 9A, a portion or subgraph of the exemplary production graph database model is illustrated. Entities—namely, the person "Jane," computer systems 1 and 2, and website foo.com—are modeled as nodes, and verbs or actions—namely, "logged in" and "visited"—are modeled as edges and/or as relationships between the nodes. Moreover, the exemplary subgraph is limited to a twenty-four (24) hour timeframe. The timeframe limitation may result from user input at a client device, for example, or a pre-defined rule that limits a trailing window according to the type of event or region of interest being reported on.

The abstracted natural language narrative may be constructed using natural language processing rules that, for example, are pre-configured with respect to each type of event or region of interest within a production graph database model. In one or more embodiments, the abstracted language processing rule may specify the timeframe limitation discussed above, the data types and formats to be presented within the abstracted natural language narrative, and the structure of that narrative. In one or more embodiments, the language processing rule(s) are also configured to receive user input (e.g., from client devices) regarding, for example, requests for narratives relating to particular entities or events, timeframes, sub-systems or other aspects of interest, and to adjust generation of the corresponding natural language narratives accordingly.

Figure 9B:
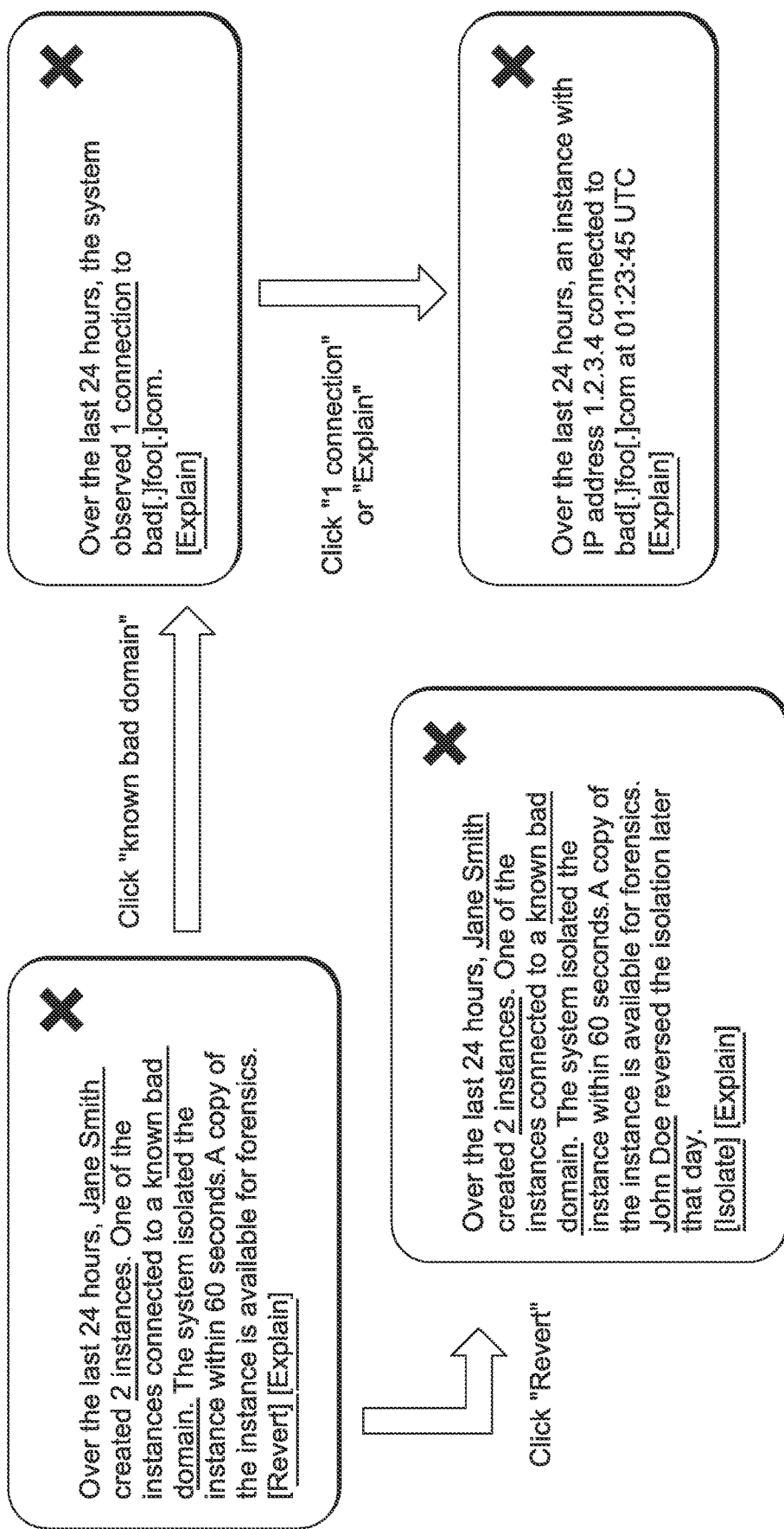
FIG. 9B is a flowchart illustrating navigation and/or toggling on a screen display between multiple independent natural language narratives, in accordance with embodiments of the present invention.

FIG. 9B illustrates a representation of an exemplary abstracted natural language narrative in the form of an independently manipulable visual display window (in the upper lefthand corner of the figure). The abstracted natural language narrative reflects the natural language processing rule from which it was constructed. For example, the rule directs inclusion of the relevant timeframe encompassing the reported actions, naming of the entity "Jane Smith," abstraction of system login events to a total number of instances (compare against the model region illustrated in FIG. 9A), and abstraction of the event of interest to a high-level category (i.e., abstraction to "connected to a known bad domain"). These entities and actions, activities and/or events are therefore abstracted in pre-determined ways and with respect to pre-determined aspects by the language processing rule, and are strung together using natural language conventions into the abstracted natural language narrative.

Referring to step 802, a representation of the abstracted natural language narrative is generated, the representation including an enabled action link and an abstraction-toggle link. The representation may be visual—such as where it comprises instructions for display of a visual window on a screen display as illustrated in FIG. 9B—or it may comprise a data structure for retrieval by, for example, a client device. In one or more embodiments, the representation is therefore a data structure configured for exposure to and access by a client device, e.g., where retrieval of the representation is enabled via an API responding to a call from the client device.

Returning to FIG. 9B, the links are embedded or hyperlinked with text of or presented adjacent to the natural language narrative within the representation. Accordingly, an owner or employee of a business organization viewing the representation on a screen display of a client device may activate one or more both links by a click of a mouse or other form of selection using a peripheral device of the client device.

The enabled action link is configured to activate an enabled action program. The enabled action program may be configured to implement or initiate one or more pre-determined changes in the behavior and/or capabilities of one or more entities within the network computing environment. As discussed in more detail above, the embedded enabled action program may be selected from among a plurality of candidate enabled action programs. The candidate enabled action programs may represent all possible or plausible actions, restrictions or limitations that may be taken or placed on one or more of the entity(ies) or identity(ies) related to or responsible for the occurrence of the event of interest which gave rise to the natural language narrative.

The monitoring device may be configured to select the linked enabled action program from among the candidate enabled action programs based at least in part on the class or nature of the event of interest (e.g., "connection to a known bad domain") and on which measures or changes are known to favorably address such event(s) within similar network computing environments.

One of ordinary skill will appreciate that generation of the candidate enabled action programs, selection of the enabled action program, corresponding pre-determined changes and other aspects of the generation, activation and impact of enabled action programs may be in accordance with the computer-implemented method 500 described in more detail above.

Returning to FIG. 9B, it should be noted that "Revert" and "Isolate" versions of the enabled action link are both illustrated, which will be discussed in more detail below.

It should also be noted that the abstraction-toggle link may be activated (e.g., at the client device) to retrieve a representation of an unabstracted natural language narrative with reference to the entity or activity the link references, as discussed in more detail below.

Referring to step 803, an unabstracted representation may be retrieved in response to user input activating the abstraction-toggle link. Turning to FIG. 9B, the abstraction-toggle link embedded with the text referencing the "known bad domain" entity may be clicked or otherwise activated for retrieval of the upper righthand independent representation of the figure. This second representation provides additional details from the corresponding region of the production graph database model relating to the domain entity and the event of interest. More particularly, the second representation provides a count for how many connections to the domain entity were made, and names the bad domain entity in the form of a uniform resource locator (URL).

In this manner, embodiments of the present invention provide for smooth, understandable viewing of portions and slivers of the production graph database model, and navigation between independent, manipulable natural language representations of those portions commensurate with varying levels of abstraction and detail relating to involved entities and activities. It should be noted that independent manipulation may include, for example, movement of windows comprising the representation and/or minimization, maximization and/or closure of such windows on the screen display of the client device. One of ordinary skill will also appreciate that multiple levels of abstraction may be navigated or otherwise traversed by a user via respective abstraction-toggle links, and that such traversal may occur in either direction (i.e., whether toward more abstract description or more detailed description, with respect to a particular entity), within the scope of the present invention.

Referring to step 804, pre-determined changes may be automatically implemented within the network computing environment in response to user input activating the enabled action link. Turning to FIG. 9B, the representation of a natural language narrative illustrated in the lower lefthand corner of the figure includes an "Isolate" link. The link is configured to activate the program that implements pre-determined isolation measures on the entity(ies) involved in accessing the known bad domain corresponding to the region or event of interest that gave rise to the exemplary natural language narratives. Accordingly, activation of the link will cause the monitoring device to automatically apply or instruct the network computing environment to apply those pre-determined changes and measures.

It should be noted that FIG. 9B illustrates "Isolate" and "Revert" versions of an enabled action program link within respective ones of the natural language narratives. In one or more embodiments, the monitoring device will provide the owner or user of the client device the option of both implementing and (subsequently) reversing the pre-determined changes of the enabled action program within the network computing environment. In each case, the underlying language processing rules may incorporate a description of the isolation and reversion events in subsequent versions of the natural language narratives, as shown in FIG. 9B. Preferably, each implementation or reversal of an enabled action program is automatically and dynamically reflected in the production graph database model from which the natural language narratives are derived. The reversion may be accomplished by an enabled action reversion program executed in response to activation of the corresponding reversion link.

It should be noted that, in one or more exemplary embodiments, an owner or user of the client device may view a representation of the abstracted natural language narrative, activate the abstraction-toggle link to view a representation of the unabstracted natural language narrative with respect to a represented entity or activity the owner would like additional detail about, and then activate the enabled action program link to implement the pre-determined changes in the network computing environment. This exemplary sequence highlights one aspect of the smooth, understandable viewing of and navigation between independent, manipulable natural language representations of portions of a production graph database model for improved control of system integrity and security according to embodiments of the present invention.

Moreover, in one or more embodiments, the monitoring device will automatically generate an explanation of the criteria that were satisfied by a region of the production graph database model. That is, the explanation may be generated to provide context for why the natural language narratives were presented to the owner or user at all. For example, the lower righthand natural language narrative representation of FIG. 9B is generated from an explanatory language processing rule configured to provide visibility into why the event of interest was flagged, presented, exposed or highlighted to the client device. In the illustrated example, the underlying rule instructed inclusion of additional detail from the region of interest in the production graph database model comprising identification of a specific IP address and time of connection. It should again be noted that processes for walking the production graph database model and identifying regions or events of interest may be substantially in accordance with the steps described above in connection with the computer-implemented methods 500, 600.

The explanatory representation and natural language narrative may be reached through activation of an explanation link from or embedded within one or both of the exemplary abstracted and unabstracted narratives discussed above, as illustrated in FIG. 9B.

The method may include additional, less, or alternate steps and/or device(s), including those discussed elsewhere herein, unless otherwise expressly stated and/or readily apparent to those skilled in the art from the description.

Exemplary Computer-Implemented Method for Activity Verification

Figure 10:
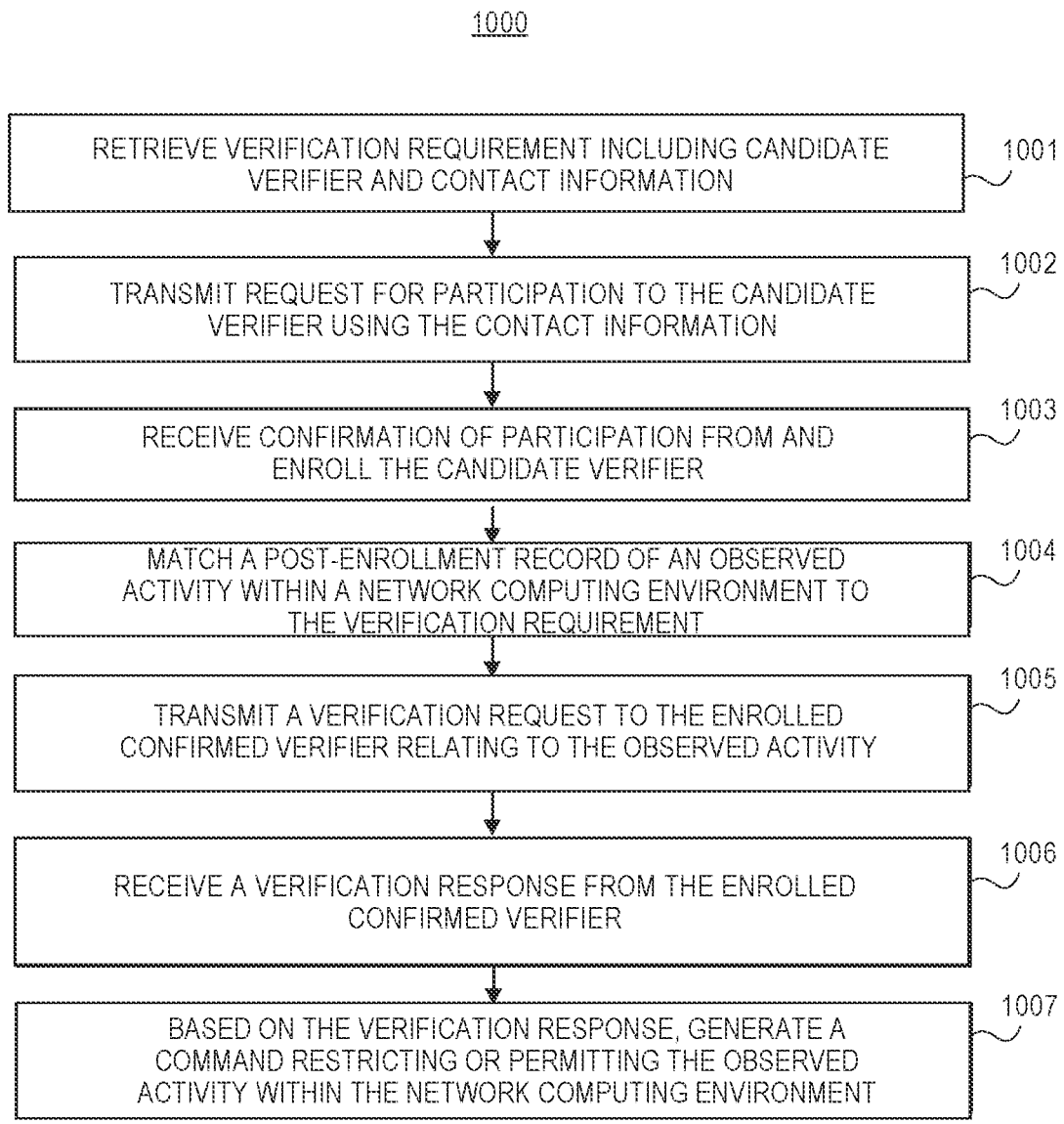
FIG. 10 illustrates at least a portion of the steps of an exemplary computer-implemented method for activity verification within a network computing environment in accordance with embodiments of the present invention.

FIG. 10 depicts a flowchart including a listing of steps of an exemplary computer-implemented method 1000 for activity verification within a network computing environment. The steps may be performed in the order shown in FIG. 10, or they may be performed in a different order. Furthermore, some steps may be performed concurrently as opposed to sequentially. In addition, some steps may be optional.

The computer-implemented method 1000 is described below, for ease of reference, as being executed by exemplary devices and components introduced with the embodiments illustrated in FIGS. 1-4, 7 and 9. For example, the steps of the computer-implemented method 1000 may be performed by the client devices 12, the servers 14, the service device 16 and the network 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 1001, a verification requirement may be retrieved that includes candidate verifier and contact information. In one or more embodiments, the candidate verifier and contact information are identified and provided at least in part by an owner or administrator of a network computing environment as part of a setup process for a security monitoring service for the network computing environment. The setup process may have been performed at a client device accessing a web portal managed by a monitoring device and otherwise as described above in connection with the computer-implemented method 500. However, it should be noted that step 1001 and subsequent steps of the method 1000 may occur independently of and/or may not be preceded by one or more of the steps outlined in connection with the computer-implemented methods 500, 600 and/or 800 without departing from the spirit of the present invention.

In connection with the setup process for the monitoring service, or subsequently in response to one or more queries from the monitoring device, the owner or administrator may identify one or more individuals (i.e., candidate verifiers) that may perform verification functions outlined in more detail below, and may provide contact information or other information enabling acquisition of contact information for the candidate verifiers by the monitoring device. For example, where access to the network computing environment by the monitoring device is managed by an authentication management framework, the owner may uniquely identify each candidate verifier by any unique data element that may be cross-referenced to the authentication management framework by the monitoring device to acquire contact information maintained by corresponding authentication databases. For another example, the monitoring device may generate links to the web portal that may be forwarded to the candidate verifiers prospectively or in connection with participation confirmation requests (discussed in more detail below) inviting the candidate verifiers to set up accounts via the web portal and provide preferred contact information for use with verification operations.

The verification requirement may identify one or more actions, events or regions of interest (in embodiments utilizing production graph database models described in more detail in preceding sections) that the requirement applies to. For example, one or more types of activity occurring within the network computing environment may automatically trigger retrieval and/or implementation of the verification requirement when observed in the environment.

It should be noted that, in one or more embodiments, the owner may not, during monitoring service setup processes, have expressly identified candidate verifiers for contact in connection with the observed activity, though the observed activity may nonetheless be subject to the verification requirement. In one or more embodiments, missing candidate verifiers for observed activity and verification requirements may be imported from other, preferably similar, verification requirements with expressly identified candidate verifiers and/or by query to the owner (with response(s) from the owner providing the missing candidate verifier information and/or identification). Also or alternatively, one or more of the missing candidate verifiers may be imported or selected from a group of general-purpose candidate verifiers identified by the owner during setup processes for the purpose of contact in connection with implementing any verification requirements lacking expressly identified candidate verifiers.

The verification requirement may also define a verification sequence. In one or more embodiments, the verification sequence comprises one or more conditions that must be satisfied for completion of verification and corresponding action within the network computing environment (discussed in more detail below). For example, the one or more conditions may include a requirement for an additional verification response from an additional enrolled confirmed verifier over and above a response from an initial enrolled confirmed verifier. The monitoring device may generate the verification requirement upon receipt of user input for one or more of the identification of the candidate verifier, contact information for the verifier, and/or definition of the verification sequence. The monitoring device may also conclude the setup processes and implement the monitoring service based at least in part on receipt of such user input.

Referring to step 1002, a request for participation may be transmitted to the candidate verifier using the contact information. In one or more embodiments, the retrieval and/or request for participation will be triggered by occurrence of one or more of the events or activities associated with the verification requirement within the network computing environment, as observed by the monitoring device (e.g., through the production graph database model) and matched against the verification requirement. The request for participation may alternatively be triggered by receipt of the user input for identification of the candidate verifier, providing contact information for the verifier, and/or defining the verification sequence, and/or in connection with automated generation of the verification requirement.

As noted above, the contact information may be specified during the service setup processes and/or as otherwise discussed above. Moreover, the candidate verifier may, in one or more embodiments, change the contact information used for verification steps outlined herein via, for example, signing up as a verifier via the web portal maintained and managed by the monitoring device.

The request for participation may include a description, for example, of one or more of: the network computing environment and/or aspects thereof that relate to the scope of the verification requirement the candidate verifier is being asked to participate in; the owner and/or business organization requesting participation from the candidate verifier; the contact information specified for use in contacting the candidate verifier; a link to sign up as a verifier and/or change personal contact information or scope of participation in verification requirement(s) the candidate is presently linked to; and other information that may provide context and scope for the participation requested of the candidate verifier. The request for participation may also include a link or button for activation at one of the client devices and/or a personal device of the candidate verifier to confirm or deny the requested participation.

One of ordinary skill will appreciate that the request for participation may be transmitted, as noted above, in response to occurrence of a corresponding event in the network computing environment, in response to initiation or completion of the monitoring service setup process(es) of the owner, and/or at other times and/or in response to other events within the scope of the present invention.

Moreover, the candidate verifier and/or any additional candidate verifiers may be authenticated to the monitoring device in connection with enrollment processes described in more detail below. For example, the monitoring device may be configured to request authenticating information from the candidate verifier(s) in an authentication request—e.g., in the form of a request for information such as email address, telephone number or the like for matching against internal monitoring device records—as a condition for completing enrollment. Upon receipt of an authentication response including the requested authentication information, and successful matching, the monitoring device may proceed with enrollment. One of ordinary skill will appreciate that a variety of authentication techniques may be used without departing from the spirit of the present invention.

Referring to step 1003, a confirmation of participation may be received from the candidate verifier, and the candidate verifier may be enrolled to the verification requirement. For example, the response to the request for participation may comprise activation of one or more links or provision of other user input confirming participation and, optionally, specifying a preferred scope of participation and/or alternative contact information or other information relating to verification activities the candidate verifier has elected to be involved with.

It should be noted that the owner of the account for the monitoring service may also periodically be queried or otherwise have the option of redefining one or more verification sequences of the verification requirement, for example in view of the candidate verifier(s) who responded confirming participation. For example, the owner may be automatically notified by the monitoring device that a first (trustworthy) candidate verifier has declined participation, but that a second (less trustworthy) candidate verifier has confirmed participation, and may login to the web portal and alter the verification sequence to add a requirement for verification from a second (less trustworthy) candidate verifier to complete a verification process.

In one or more embodiments, the monitoring device may also or alternatively automatically or dynamically update or prioritize enrolled verifiers, for example based on verification performance. For example, where an owner defines tiers of candidate verifiers during setup according to trustworthiness, yet only requires a single verification from one enrolled verifier of a most trusted tier to complete verification, the monitoring device may be configured to automatically prioritize enrolled verifiers of the most trusted tier based on observed responsiveness to verification requests. One of ordinary skill will appreciate that a variety of verification sequences may be utilized, and that such sequences may be defined and/or updated intermittently, without departing from the spirit of the present invention.

Enrollment of the candidate verifier may comprise entry of a data element or record at or for access by the monitoring device indicating that the candidate verifier has agreed to participate in one or more verification processes discussed in more detail below.

Referring to step 1004, a post-enrollment record of an observed activity within the network computing environment may be matched to the verification requirement. In one or more embodiments, the observed activity may correspond to an activity or event of interest. In one or more embodiments, the observed activity may satisfy pre-defined criteria for a region of interest wherever the network computing environment is represented in a production graph database model according to the discussion of preceding sections. The matching may comprise classifying the observed activity as falling within the one or more regions or events of interest defined by the verification requirement discussed above.

Referring to step 1005, a verification request may be transmitted to the enrolled confirmed verifier relating to the observed activity. The verification request may include a description, for example, of one or more of: the network computing environment and/or aspects thereof that relate to the observed activity and/or within which the observed activity occurred; and the observed activity and related entities, activities, timeframe and details surrounding and providing context for the event(s). The verification request may also include a link or button for activation at one of the client devices and/or a personal device of the enrolled verifier to verify or refuse verification of the observed activity.

In one or more embodiments, the verification request may take the form of a representation of a natural language narrative describing the observed activity (i.e., the region of interest), in accordance with the discussion above and, particularly, with the steps of computer-implemented method 800. For example, the verification request may comprise a representation of an abstracted natural language narrative describing the observed activity, and may include an enabled action program link for verifying and permitting the observed activity within the network computing environment and/or for denying or restricting the observed activity. Moreover, the representation may include links to representations of unabstracted natural language narratives including additional details relating to one or more of the entities or activities described in the abstracted natural language narrative and/or to an explanation narrative describing why the verification requirement was triggered. It should also be noted that transmission of the verification request may, in one or more embodiments, be conditioned on activation of an enabled action program by an owner of the monitoring service from a natural language narrative offering verification in connection with a description of the activity to be verified.

One of ordinary skill will appreciate that related functions or steps discussed above in connection with one or more of computer-implemented methods 500, 600, 800 may be executed or taken with the steps of the method 1000 within the scope of the present invention. One of ordinary skill will also appreciate that one or all steps of computer-implemented methods 500, 600, 800 may be excluded or omitted from the method 1000 without departing from the scope of the present invention.

It should be noted here that the contact information and/or timing of a verification request may be automatically adjusted by the monitoring device based at least in part on urgency or priority of the verification operation. In one or more embodiments, the monitoring device may be configured to automatically prioritize or rank the importance of the observed activity and, based on the ranking, select and implement more or less invasive contact means and/or timing for verification procedures.

Referring to step 1006, a verification response may be received from the enrolled confirmed verifier. As discussed above, the verification response may be received in the form of data reflecting activation of a link of the verification request at a client device. In one or more embodiments, the verification response will comprise activation of an enabled action program link automatically causing implementation of pre-determined changes in the network computing environment alternatively permitting or restricting the observed activity.

However, in one or more embodiments the verification sequence may require intermediate verification steps prior to completion of verification and/or implementation of changes in the network computing environment. It should also be noted that a verification response permitting the observed activity may not trigger changes in the network computing environment, for example where the observed activity was or would remain permitted unless affirmatively restricted. Likewise, a verification response restricting the observed activity may not trigger changes in the network computing environment, for example where the observed activity is inherently not permitted in the absence of a verification response permitting same.

It should be noted that a verification response may take forms other than activation of a link without departing from the spirit of the present invention.

Referring to step 1007, a command restricting or permitting the observed activity within the network computing environment may be generated based on the verification response. In one or more embodiments, the command is not generated solely based on the verification response, but may be generated based also on the responses of one or more additional enrolled verifiers (e.g., where additional verifiers are required by the verification sequence and/or where the response of the first enrolled verifier is a timeout lack of reply or other failure to provide a confirmation or denial). Moreover, the command may comprise an enabled action program, and the monitoring device may be configured to attach the enabled action program to a natural language narrative describing the verification process(es) and/or the triggering observed activity via a link. Exemplary natural language narratives, enabled action programs and corresponding links are discussed in more detail in connection with method 800 above. Accordingly, the monitoring device may be configured to generate and transmit a notification comprising or linking to the natural language narrative—and providing a link for activation of the corresponding enabled action program by, for example, an owner of the monitoring service—as a prerequisite to implementation of the restrictions or permissions within the network computing environment.

In one or more embodiments, the monitoring device and/or owner may impose restriction(s) on the form or timing of verification response(s). The verification sequence of the verification requirement may reflect such restriction(s). For example, the verification sequence may request automated transmission of a second verification request to a second enrolled verifier in the event of a timeout or failure of response from the first enrolled verifier. Also or alternatively, the verification sequence may require multiple non-conflicting verification responses from multiple simultaneously-queried enrolled verifiers to complete the verification and/or may include rules for resolving conflicting verification responses from multiple enrolled verifiers. For example, where a confirmation response is received from one second tier enrolled verifier, and a denial response is received from another second-tier enrolled verifier, the monitoring device may be configured to seek a third "tie-breaking" response from a first-tier enrolled verifier (e.g., the account owner or administrator) or from a third second tier enrolled verifier.

One of ordinary skill will appreciate that a variety of verification sequences fall within the scope of the present invention. For example, in one or more embodiments, a verification requirement may prescribe a verification sequence mandating confirmation from an additional enrolled verifier under any circumstance (i.e., regardless of the response received from an initial enrolled verifier). In such embodiments, the monitoring device may proceed with the enrollment processes of steps 1002-1003 to enroll the additional verifier. Once enrolled, the additional verifier may participate in the verification processes of steps 1004-1007 above, with the generated command being based at least in part on the additional verifier's verification response, as discussed above.

It should also be noted that the command restricting or permitting the observed activity may merely comprise a command forestalling further changes within the network computing environment, as discussed on more detail above, wherever such changes are unnecessary to bring implement the results of the verification processes discussed above.

It should be reiterated that a central goal of embodiments of the present invention is to provide a technological mechanism for improved intervention in the network computing environment. In one or more preferred embodiments, the mechanism is employed within network computing environments modeled on production graph database models and relying on natural language narratives for enhanced entity resolution. This presents an improved method for providing visibility into operation of resources within the network computing environment and the ability for owner(s) or others administrating or participating in utilization of monitoring and/or verification service(s) to intervene in pre-determined and system-specific ways to preserve, for example, system integrity and security.

The method may include additional, less, or alternate steps and/or device(s), including those discussed elsewhere herein, unless otherwise expressly stated and/or readily apparent to those skilled in the art from the description.

Exemplary Computer-Implemented Method for Autonomous Cybersecurity

Figure 11:
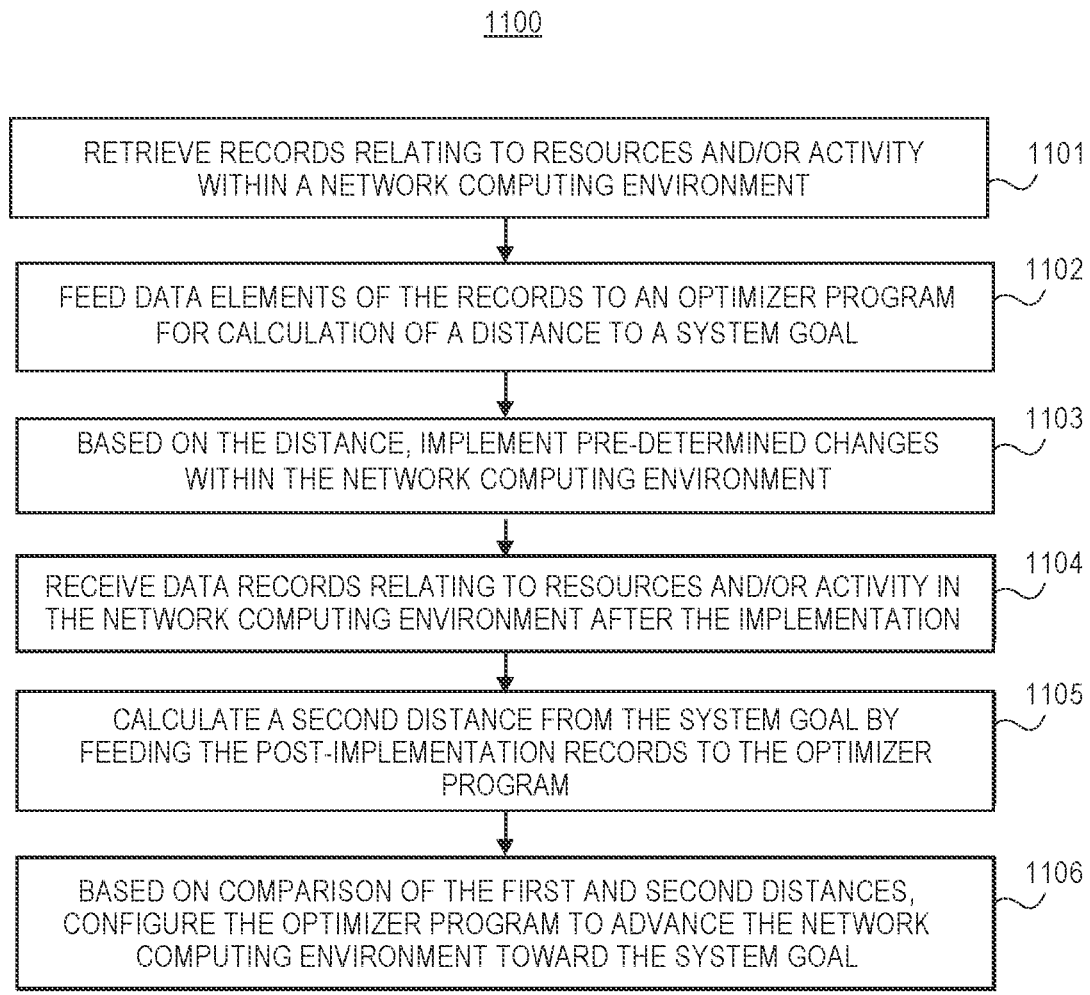
FIG. 11 illustrates at least a portion of the steps of an exemplary computer-implemented method for autonomous cybersecurity within a network computing environment in accordance with embodiments of the present invention.

FIG. 11 depicts a flowchart including a listing of steps of an exemplary computer-implemented method 1100 for autonomous cybersecurity. The steps may be performed in the order shown in FIG. 11, or they may be performed in a different order. Furthermore, some steps may be performed concurrently as opposed to sequentially. In addition, some steps may be optional.

The computer-implemented method 1100 is described below, for ease of reference, as being executed by exemplary devices and components introduced with the embodiments illustrated in FIGS. 1-4, 7 and 9. For example, the steps of the computer-implemented method 1100 may be performed by the client devices 12, the servers 14, the service device 16 and the network 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 1101, records or observations relating to activity and/or resources within a network computing environment may be retrieved. In one or more embodiments, the records may include records retrieved in connection with expanded resource and/or entity description according to computer-implemented methods 500, 600 discussed above. Further, the records may be retrieved from resources and/or data sources within the network computing environment such as those discussed in more detail above in connection with the computer-implemented methods 500, 600. Turning briefly to FIG. 7, the records may be retrieved from one or more of Data Sources A-D of the depicted environment.

Still further, the records may be retrieved through instrumenting the network computing environment to generate/expose previously-uncollected or previously-unexposed data, as discussed in more detail above. For example, pre-defined data collection requirements of an observer program (discussed in more detail below) may cause the monitoring device to instruct at least one resource within the network computing environment to supplement pre-existing data collection practices and to report out or expose corresponding supplemental data relating to one or more of network traffic, endpoint behavior, serverless code execution, logging systems, and authentication systems.

Yet still further, the records may be retrieved continuously, intermittently, and/or in response to a trigger and/or the passage of a pre-determined period of time, and may be preceded by owner enrollment processes, as discussed in more detail above. More particularly, the records may be retrieved following owner enrollment, provision of access credentials for the network computing environment, and/or establishment of electronic communication between the monitoring device and the network computing environment and/or the device(s) on which the environment is hosted. One of ordinary skill will appreciate, however, that record retrieval according to step 1101 may occur independently of and/or may not be preceded by one or more of the steps outlined in connection with the computer-implemented methods 500, 600 without departing from the spirit of the present invention.

The records may comprise data elements relating to the resources and/or activity within the network computing environment, and may be structured. In one or more embodiments, the monitoring device may alternatively be configured to parse and label unstructured data for use in the computer-implemented method 1100.

In one or more embodiments, the records or observations are generated by an observer program configured to pre-process, enrich or otherwise process raw data from the network computing environment into the records. For example, the observer program may comprise a component of the monitoring device program (see, e.g., FIG. 7) discussed above in connection with the computer-implemented method 600, whereby the records are in the form of natural language narratives or representations thereof generated by the monitoring device (for example as derived from the production graph database model described in earlier sections above).

It should also be noted that retrieval of the records may be preceded by a setup process, such as where the network computing environment comprises a test environment. For example, the owner of an account for the monitoring service may specify a desired production environment to be mirrored—"as-is" or with artificial changes—in a test environment for optimization testing. The test environment may be set up according to a scenario manually or automatically configured by the monitoring device. The scenario may specify entities to populate and simulate within the test environment, along with details of the activities to be engaged in by and relationships between the entities.

Referring to step 1102, data elements of the records may be fed to an optimizer program for calculation of a distance to a system goal. In one or more embodiments, the system goal may include or comprise one or more of: preventing or reducing the introduction of one or more types of new executable code into the network computing environment; preventing or restricting communications between one or more entities in the network computing environment and external, black-listed systems (e.g., over the internet); reducing operational, integrity and/or security impact on the environment resulting from access originating outside the environment; and other goals aimed at improving the operation, integrity and/or security of the environment.

The optimizer program may be configured to determine a "distance" to the system goal(s). The calculation may be made by the monitoring device. The optimizer program may calculate the state of the environment along one or more metrics or variables over a given timeframe—such as, for example, operational efficiency of and/or load on one or more environment resources, percentage of resources occupied with execution of new code segments, number of or volume resulting from calls for environment resources and/or data originating externally, or the like—that alone or collectively (e.g., via a weighted average) comprise the system goal(s). In one or more embodiments, a higher weighted average for the one or more metrics or variables may represent a greater "distance," whereas a lower weighted average may represent a lower "distance" and, therefore, proximity to the goal state for the environment.

Referring to step 1103, pre-determined changes may be implemented within the network computing environment based on the distance. In one or more embodiments, the optimizer program is configured to select and/or modulate one or more pre-determined changes based on the state of the environment as represented by the calculated distance. For example, a given pre-determined change may be reserved for use only where distances meeting or exceeding a pre-determined threshold are calculated. For another example, one or more of the pre-determined changes to be implemented may be scaled up or down based at least in part on the distance.

In one or more embodiments, a pre-determined change such as a restriction on entities that may write to a database may rely on a table organizing the entities present in the environment into tiers by class or type of resource, sensitivity of data handled by the resources, position within the environment, relationships between the entities and/or based on other aspects of the resources. Where the calculated distance is large, the write restrictions of the pre-determined changes may be applied to multiple tiers of the entities, whereas a smaller distance may reduce application of the write restrictions to only one or perhaps two of the tiers. One of ordinary skill will appreciate that a variety of heuristics or rules may be applied to select and/or modulate pre-determined changes within the scope of the present invention.

The available changes and/or modulations to the changes may be pre-configured (e.g., may be heuristic-based) and/or may be learned by the optimizer program. For example, in one or more embodiments, the optimizer program may be configured with machine learning components for recognizing or determining correlations between pre-determined changes on the one hand, and advancement of the environment state toward the system goal(s) on the other hand. In one or more embodiments, the machine learning program may distinguish between efficacy of a given pre-determined change generally as it relates to advancement toward the goal, and/or between efficacy of the change as applied to an individual resource or class of resources or entities in the network computing environment. Such learning may extend to efficacy correlation determinations that consider particular arrangements of and/or relationships between entities. Moreover, it should be noted that such learning is preferably customized for and/or particularly applicable within the environment in which it was developed, as efficacy may vary between environments and their respective populations of entities and/or activities and/or relationships.

The machine learning techniques or programs may include curve fitting, regression model builders, convolutional or deep learning neural networks, combined deep learning, pattern recognition, or the like. Based upon this data analysis, the machine learning program(s) may learn method(s) for selecting and modulating pre-determined changes for addressing advancement of the environment state toward one or more system goal(s).

It should be noted that, in supervised machine learning, the program may be provided with example inputs (i.e., pre-determined change(s)) and their associated outputs (i.e., advancement toward a system goal), and may seek to discover a general rule that maps inputs to outputs for improved automated and dynamic toward the system goal. In unsupervised machine learning, the program may be required to find its own structure in unlabeled example inputs.

The program may utilize classification algorithms such as Bayesian classifiers and decision trees, sets of pre-determined rules, and/or other algorithms to generate and improve methods for selecting and applying pre-determined changes.

Moreover, the machine learning outlined above may take as inputs pre-determined changes selected and/or modulated by one or more user input(s), such as where an employee or administrator of the monitoring service selects such changes via input at a service device. The machine learning components of the optimizer program may automatically register such change(s) and corresponding distance(s) from the system goal within the environment and develop corresponding correlations for use in selecting and/or modulating future changes for implementation in the environment. Also or alternatively, the optimizer program may itself be partly or entirely responsible for selecting and learning from changes implemented within the environment.

It should also be noted that the scope of all available or possible candidate pre-determined changes to be selected from and/or modulated for potential implementation within the network computing environment may be pre-configured and/or may at least in part be automatically and/or dynamically discovered and/or enumerated by the optimizer program. In one or more embodiments, the optimizer program may rely at least in part on enabled action programs and corresponding actions enumerated, discovered and/or attached in accordance with the discussion above of computer-implemented methods 500, 600, 800. The optimizer program may additionally cull possible candidates for the pre-determined changes for use in addressing system goal(s) based, for example, on the pre-configured heuristics and rules and/or machine learning components discussed above.

For example, the pre-determined changes may include all or some of the following with respect to one or more entities within the network computing environment: (i) restrictions on, and/or enablement of, behavior and/or capabilities of the one or more entities; and (ii) instructions for the creation or deactivation of, and/or for the performance of one or more activities by, the one or more entities.

One of ordinary skill will also appreciate that, in one or more embodiments, the optimizer program may be unable to identify one or more pre-determined changes effective in moving the environment state toward the system goal(s) and/or may exhaust the effectiveness of any such changes. In such embodiments, the monitoring device may be configured to seek user input from one or both of the owner and employee(s) implementing the monitoring service suggesting or exposing pre-determined changes for implementation in connection with the method 1100.

Moreover, in one or more embodiments, implementation of the pre-determined changes within the network computing environment may be conditioned upon user input. For example, in one or more embodiments, the pre-determined change to be implemented may be presented to an owner and/or employee of the monitoring service for execution in the form of an enabled action program attached to a representation (e.g., visual) of a natural language narrative describing the state of the network computing environment as it relates to the system goal (i.e., the region of interest). Generation and transmission of, and responses to, such a natural language narrative representation may be in accordance with the corresponding disclosures above in connection with computer-implemented methods 500, 600, 800. Moreover, the pre-determined changes implemented in response to activation of any such enabled action program link may be made alongside or in addition to pre-determined changes made, for example, pursuant to computer-implemented method 800.

Referring now to step 1104, data records relating to resources and/or activity in the network computing environment after the implementation may be received. As with the initial records retrieved pursuant to step 1101, data records in one or more embodiments may take the form of natural language narratives prepared in accordance with one or more of computer-implemented methods 500, 600, 800 discussed in more detail above. However, it should be appreciated that the records may comprise other structured and/or unstructured data without departing from the spirit of the present invention.

The post-implementation records preferably reflect the state and/or activity of the resources and other entities within the network computing environment following implementation of the pre-determined changes.

Referring to step 1105, a second distance from the system goal may be calculated by feeding the post-implementation records to the optimizer program in a follow-up comparison. Referring to step 1106, based on a comparison of the first and second distances, the optimizer program may be configured to advance the network computing environment toward the system goal. For example, in one or more embodiments, the system goal remains constant between calculations of the first and second distances, and the delta between the first and second distances provides an indicator of whether the implemented pre-determined changes were effective in advancing toward the goal and to what degree. In one or more embodiments, where the second distance is less than the first distance, the optimizer program may determine that the pre-determined change were effective and may configure itself for further implementation of changes based on, derived from or comprising the implemented pre-determined changes within the network computing environment.

The optimizer program may be configured (e.g., through automated self-configuration) for further advancement toward the system goal based on the observed efficacy or lack thereof of the pre-determined changes and/or by determining that the system goal has been reached and no additional changes are presently needed. Moreover, the reconfiguration may be granular—such as where the machine learning component correlates the pre-determined change(s) with advancement toward the system goal with respect to certain resources but not others—without departing from the spirit of the present invention. The configuration based on comparison of the first and second distances may include scheduling future rounds of implementing pre-determined changes based at least in part on the implemented pre-determined changes, generating additional types of pre-determined changes based on the implemented pre-determined changes, or other configurations and/or actions that may advance the network computing environment toward the system goal.

One of ordinary skill will appreciate that all or some of the optimizer program functions—such as implementation of one or more pre-determined changes—may be restricted by owner input and/or other pre-configuration. For example, a system goal and/or pre-determined change (and/or resource(s) that may be acted on by such change(s)) may be subject to sunset(s) and/or other time restrictions. For another example, certain observed activity or events occurring within the network computing environment may trigger deactivation of all or some of the activity of the optimizer program, such as where a threat passes or where a resource is added, moved or reconfigured in a manner that inherently reduces threat to acceptable levels.

It should be reiterated that a central goal of embodiments of the present invention is to provide a technological mechanism for improved system integrity and security. Namely, embodiments of the present invention automatically take steps to shore up perceived weakness(es) in system integrity and security. This presents an improved method for providing visibility into operation of resources within the network computing environment and the ability for owner(s) or others administrating or participating in utilization of monitoring and/or verification service(s) to utilize automated methods for intervening in pre-determined and system-specific ways to preserve system integrity and security.

The method may include additional, less, or alternate steps and/or device(s), including those discussed elsewhere herein, unless otherwise expressly stated and/or readily apparent to those skilled in the art from the description.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein, unless otherwise expressly stated and/or readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. Non-transitory computer-readable storage media having computer-executable instructions stored thereon for autonomous cybersecurity within a network computing environment, wherein when executed by at least one processor the computer-executable instructions cause the at least one processor to:
   establish electronic communication with a network computing environment;
   receive data records from a data source, each of the data records containing data elements relating to resources and/or activity within the network computing environment;
   feed the data records to an observer program to generate at least some data elements of one or more of the data records, the observer program being configured to
   generate the at least some data elements at least in part by
   applying pre-processing rules to compare the data records against a plurality of pre-defined profiles, the plurality of pre-defined profiles including a plurality of pre-defined node profiles and a plurality of pre-defined edge profiles,
   based on the application of the pre-processing rules, identifying a plurality of pre-matched records of the data records, each of the plurality of pre-matched records matching at least one of the plurality of pre-defined profiles,
   building a production graph database model at least in part by modeling the plurality of pre-matched records using corresponding ones of the plurality of pre-defined profiles,
   generating a natural language narrative describing a region of interest within the production graph database model, the natural language narrative comprising the at least some data elements,
   execute an optimizer program and feed the at least some data elements to the optimizer program for comparison against a system goal and calculation of a first distance to the system goal based on the comparison;
   based on the first distance, implement pre-determined changes in the network computing environment;
   receive additional data records containing additional data elements recorded within the network computing environment following the implementation of the pre-determined changes;
   execute the optimizer program and feed at least some of the additional data elements of one or more of the additional data records to the optimizer program for follow-up comparison against the system goal and calculation of a second distance to the system goal based on the follow-up comparison;
   determine that the second distance is less than the first distance; and
   based on the determination, configure the optimizer program for additional changes to further advance the network computing environment toward the system goal.

2. The non-transitory computer-readable storage media of claim 1, wherein the pre-determined changes include all or some of the following with respect to one or more entities within the network computing environment: (i) restrictions on, and/or enablement of, behavior and/or capabilities of the one or more entities; and (ii) instructions for the creation or deactivation of, and/or for the performance of one or more activities by, the one or more entities.

3. The non-transitory computer-readable storage media of claim 1, wherein the computer-executable instructions further cause the at least one processor to:
   attach an enabled action program to the natural language narrative, execution of the enabled action program restricting the behavior and/or capabilities of one or more entities within the network computing environment,
   generate a visual representation of the natural language narrative for display at a screen display of a client device, the visual representation including a button configured to receive user input instructing execution of the enabled action program,
   in response to user input instructing execution of the enabled action program, automatically restrict the behavior and/or capabilities of one or more entities within the network computing environment.

4. The non-transitory computer-readable storage media of claim 1, wherein the computer-executable instructions further cause the at least one processor to:
   based on pre-defined data collection requirements of the observer program, instruct at least one resource within the network computing environment to supplement pre-existing data collection practices and to report out or expose corresponding supplemental data relating to one or more of network traffic, endpoint behavior, serverless code execution, logging systems, and authentication systems.

5. The non-transitory computer-readable storage media of claim 1, wherein the network computing environment comprises at least one cloud computing account and/or cloud service type.

6. The non-transitory computer-readable storage media of claim 1, wherein the comparison and the follow-up comparison against the system goal are performed using a machine learning system state model of the optimizer program, the machine learning system state model being configured to generate the first and second distances from the system goal.

7. The non-transitory computer-readable storage media of claim 6, wherein the optimizer program is configured for the additional changes by a machine learning change model of the optimizer program, the machine learning change model being configured to relate differences between the first and second distances to the pre-determined changes implemented in the network computing system.

8. The non-transitory computer-readable storage media of claim 6, wherein the pre-determined changes are automatically discovered within the network computing system and selected by the machine learning change model for implementation within the network computing system.

9. A computer-implemented method for autonomous cybersecurity within a network computing environment comprising, via one or more transceivers and/or processors:
   establishing electronic communication with a network computing environment;

receiving data records from a data source, each of the data records containing data elements relating to resources and/or activity within the network computing environment;

feeding the data records to an observer program to generate at least some data elements of one or more of the data records, the observer program being configured to generate the at least some data elements at least in part by:

applying pre-processing rules to compare the data records against a plurality of pre-defined profiles, the plurality of pre-defined profiles including a plurality of pre-defined node profiles and a plurality of pre-defined edge profiles, based on the application of the pre-processing rules, identifying a plurality of pre-matched records of the data records, each of the plurality of pre-matched records matching at least one of the plurality of pre-defined profiles, building a production graph database model at least in part by modeling the plurality of pre-matched records using corresponding ones of the plurality of pre-defined profiles, generating a natural language narrative describing a region of interest within the production graph database model, the natural language narrative comprising the at least some data elements, executing an optimizer program and feeding the at least some data elements to the optimizer program for comparison against a system goal and calculation of a first distance to the system goal based on the comparison;

based on the first distance, implementing pre-determined changes in the network computing environment;

receiving additional data records containing additional data elements recorded within the network computing environment following the implementation of the pre-determined changes;

executing the optimizer program and feeding at least some of the additional data elements of one or more of the additional data records to the optimizer program for follow-up comparison against the system goal and calculation of a second distance to the system goal based on the follow-up comparison;

determining that the second distance is less than the first distance; and based on the determination, configuring the optimizer program for additional changes to further advance the network computing environment toward the system goal.

10. The computer-implemented method of claim 9, wherein the pre-determined changes include all or some of the following with respect to one or more entities within the network computing environment: (i) restrictions on, and/or enablement of, behavior and/or capabilities of the one or more entities; and (ii) instructions for the creation or deactivation of, and/or for the performance of one or more activities by, the one or more entities.

11. The computer-implemented method of claim 9, further comprising, via the one or more transceivers and/or processors:

attaching an enabled action program to the natural language narrative, execution of the enabled action program restricting the behavior and/or capabilities of one or more entities within the network computing environment, generating a visual representation of the natural language narrative for display at a screen display of a client device, the visual representation including a button configured to receive user input instructing execution of the enabled action program, in response to user input instructing execution of the enabled action program, automatically restricting the behavior and/or capabilities of one or more entities within the network computing environment.

12. The computer-implemented method of claim 9, further comprising, via the one or more transceivers and/or processors:

based on pre-defined data collection requirements of the observer program, instructing at least one resource within the network computing environment to supplement pre-existing data collection practices and to report out or expose corresponding supplemental data relating to one or more of network traffic, endpoint behavior, serverless code execution, logging systems, and authentication systems.

13. The computer-implemented method of claim 9, wherein the network computing environment comprises at least one cloud computing account and/or cloud service type.

14. The computer-implemented method of claim 9, wherein the comparison and the follow-up comparison against the system goal are performed using a machine learning system state model of the optimizer program, the machine learning system state model being configured to generate the first and second distances from the system goal.

15. The computer-implemented method of claim 14, wherein the optimizer program is configured for the additional changes by a machine learning change model of the optimizer program, the machine learning change model being configured to relate differences between the first and second distances to the pre-determined changes implemented in the network computing system.

16. The computer-implemented method of claim 14, wherein the pre-determined changes are automatically discovered within the network computing system and selected by the machine learning change model for implementation within the network computing system.

* * * * *